US012737738B2

(12) United States Patent
Kievit

(10) Patent No.: US 12,737,738 B2
(45) Date of Patent: Sep. 15, 2026

(54) SYSTEMS AND METHODS FOR PAYMENT INSTRUMENT PRE-QUALIFICATION DETERMINATIONS

(71) Applicant: Synchrony Bank, Stamford, CT (US)

(72) Inventor: William Kievit, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 18/752,931

(22) Filed: Jun. 25, 2024

(65) Prior Publication Data

US 2025/0005545 A1 Jan. 2, 2025

Related U.S. Application Data

(60) Provisional application No. 63/510,417, filed on Jun. 27, 2023.

(51) Int. Cl.

| | |
|---|---|
| ***G06Q 40/00*** | (2023.01) |
| ***G06N 20/00*** | (2019.01) |
| ***G06Q 20/10*** | (2012.01) |
| ***G06Q 20/40*** | (2012.01) |

(52) U.S. Cl.

CPC ............. *G06Q 20/10* (2013.01); *G06N 20/00* (2019.01); *G06Q 20/40* (2013.01)

(58) Field of Classification Search

CPC ............................... G06Q 20/10; G06N 20/00

See application file for complete search history.

(56) References Cited

U.S. PATENT DOCUMENTS 5,950,179 A * 9/1999 Buchanan ................. G07F 7/08 705/38
5,953,710 A * 9/1999 Fleming ............... G06Q 20/405 235/380
6,158,657 A * 12/2000 Hall, III ................ G07F 7/1008 235/379

(Continued)

FOREIGN PATENT DOCUMENTS

WO WO-0118708 A1 * 3/2001 ............... G07F 7/08

OTHER PUBLICATIONS

Santucci, "Discussion Paper—Moving in the Mainstream: Who Graduates from Secured Credit Card Programs?" Federal Reserve Bank of Philadelphia, Consumer Finance Institute, 2019 (Year: 2019).*

(Continued)

*Primary Examiner* — Abhishek Vyas
*Assistant Examiner* — William B. Bunker
(74) *Attorney, Agent, or Firm* — Polsinelli PC

(57) ABSTRACT

Systems and methods for automatically generating and providing pre-qualification determinations for different secured and unsecured payment instruments are provided. In response to receiving an application for a secured payment instrument, the system obtains spend data associated with a user. The spend data corresponds to expenditures according to different spend categories. A machine learning algorithm is trained to identify a set of allowances corresponding to the different spend categories. This set of allowances are used to secure the secured payment instrument, which is issued to the user. The machine learning algorithm is updated using transaction data corresponding to usage of the secured payment instrument and historical data.

21 Claims, 8 Drawing Sheets

(56) References Cited

U.S. PATENT DOCUMENTS

| | | | | |
|---|---|---|---|---|
| 8,392,331 | B2 * | 3/2013 | Ross | G06Q 20/10<br>705/41 |
| 10,210,509 | B2 * | 2/2019 | Acosta | G06Q 20/382 |
| 10,572,862 | B2 * | 2/2020 | Robinson | G06Q 20/10 |
| 11,315,179 | B1 * | 4/2022 | Rehder | G06Q 30/0226 |
| 11,321,697 | B1 * | 5/2022 | MacDonald | G06Q 20/2295 |
| 11,854,075 | B1 * | 12/2023 | May | G06Q 30/0283 |
| 2003/0004868 | A1 * | 1/2003 | Early | G06Q 40/04<br>705/39 |
| 2005/0173520 | A1 * | 8/2005 | Jaros | G07F 7/08<br>235/380 |
| 2006/0031161 | A1 * | 2/2006 | D'Agostino | G06Q 20/105<br>705/44 |
| 2007/0136194 | A1 * | 6/2007 | Sloan | G07F 7/1008<br>705/41 |
| 2012/0197800 | A1 * | 8/2012 | Ross | G06Q 20/40<br>705/44 |
| 2014/0310150 | A1 * | 10/2014 | Petty | G06Q 40/03<br>705/38 |
| 2024/0135343 | A1 * | 4/2024 | Nazari | G06Q 20/405 |

OTHER PUBLICATIONS

Peter Psathas, "Top of the Class: Assessing the Credit Performance of Graduates from Secured Credit Card Programs," Federal Reserve Bank Philadelphia, Consumer Finance Institute, 2024 (Year: 2024).*

Ian McGroaty, "CFI in Focus: Secured Credit Cards," Federal Reserve Bank Philadelphia, Consumer Finance Institute, 2019 (Year: 2019).*

Santucci, "The Secured Credit Card Market," Discussion Paper, Payment Card Center, Federal Reserve Bank of Philadelphia, 2016 (Year: 2016).*

Santucci, "Secured Card Market Update," Consumer Finance Institute, Federal Reserve Bank of Philadelphia, 2024 (Year: 2024).*

* cited by examiner

SYSTEMS AND METHODS FOR PAYMENT INSTRUMENT PRE-QUALIFICATION DETERMINATIONS

CROSS-REFERENCE TO RELATED APPLICATIONS

The present patent application claims the benefit of priority to U.S. Provisional Patent Application 63/510,417, filed Jun. 27, 2023, which is incorporated herein by reference in its entirety for all purposes.

FIELD

The present disclosure relates generally to automatic and dynamic pre-qualification determinations associated with secured payment instruments. In one example, in response to a receiving an application for a secured payment instrument, the systems and methods described herein may obtain spend data associated with a user. The systems and methods described herein may implement a machine learning algorithm is trained to identify a set of allowances corresponding to the different spend categories. This set of allowances are used to secure the secured payment instrument, which is issued to the user.

SUMMARY

Disclosed embodiments provide a framework for automatically and dynamically defining a set of allowances corresponding to different spend categories for secured payment instruments. According to some embodiments, a computer-implemented method is provided. The computer-implemented method comprises receiving an application for a secured payment instrument. The application includes account information corresponding to a financial account associated with a user. The computer-implemented method further comprises obtaining spend data associated with the user. The spend data corresponds to expenditures according to different spend categories. Further, the spend data is obtained using the account information to access the financial account. The computer-implemented method further comprises training a machine learning algorithm to identify a set of allowances corresponding to the different spend categories. The machine learning algorithm is trained using the account information, the spend data, and historical data corresponding to other users. The computer-implemented method further comprises issuing the secured payment instrument. The secured payment instrument is secured by the set of allowances and the financial account. The computer-implemented method further comprises updating the machine learning algorithm. The machine learning algorithm is updated using transaction data corresponding to usage of the secured payment instrument and the historical data.

In some embodiments, the computer-implemented method further comprises obtaining a credit evaluation corresponding to the user. The credit evaluation is obtained based on the application. The computer-implemented method further comprises using the credit evaluation to adjust the set of allowances.

In some embodiments, the computer-implemented method further comprises training a second machine learning algorithm to determine whether to graduate the secured payment instrument to an unsecured payment instrument. The second machine learning algorithm is trained using the transaction data and the historical data. The computer-implemented method further comprises providing an offer to graduate the secured payment instrument to the unsecured payment instrument. When the offer is accepted, the set of allowances are removed from the secured payment instrument to graduate the secured payment instrument to the unsecured payment instrument.

In some embodiments, the computer-implemented method further comprises providing the set of allowances. When the set of allowances are received by the user, the user can provide modifications to the set of allowances. The computer-implemented method further comprises evaluating the modifications according the spend data and the historical data. When the modifications are accepted, the secured payment instrument is issued according to the modifications.

In some embodiments, the computer-implemented method further comprises automatically processing the transaction data in real-time to determine modifications to the set of allowances. The computer-implemented method further comprises dynamically updating the secured payment instrument. The secured payment instrument is dynamically updated according to the modifications to the set of allowances.

In some embodiments, the computer-implemented method further comprises automatically tracking a credit performance associated with the user. The credit performance corresponds to usage of the secured payment instrument according to the set of allowances. Further, the credit performance is tracked in real-time. The computer-implemented method further comprises dynamically updating the set of allowances using the credit performance.

In some embodiments, the secured payment instrument is secured without a security deposit.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

Figure 1:
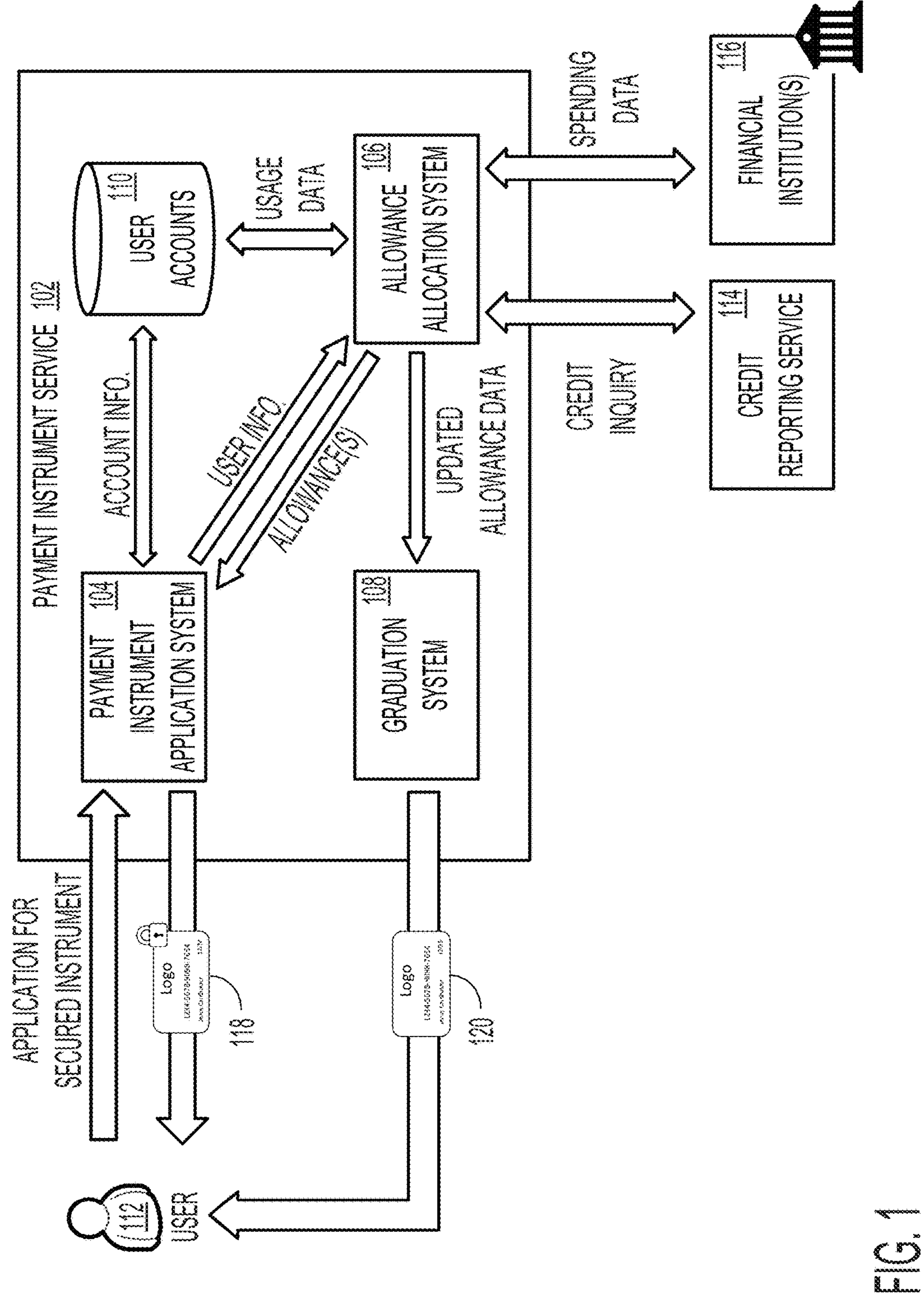
FIG. 1 shows an illustrative example of an environment in which a payment instrument service evaluates spending data associated with a user to identify a set of allowances to be allocated in order to secure a line of credit associated with a secured payment instrument in accordance with at least one embodiment.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework for automatically generating and providing pre-qualification determinations for different secured and unsecured payment instruments. In response to receiving an application for a secured payment instrument, the systems and methods described herein may obtain spend data associated with a user. This spend data may correspond to expenditures according to different spend categories. A machine learning algorithm is trained to identify a set of allowances corresponding to the different spend categories. This set of allowances are used to secure the secured payment instrument, which is issued to the user. The machine learning algorithm is updated using transaction data corresponding to usage of the secured payment instrument and historical data.

A secured payment instrument, as described in greater detail herein, may be a payment instrument associated with an account that is secured via a combination of spending allowances according to different spend categories and a savings account or other account maintained via one or more financial institutions (e.g., banks, credit unions, etc.). An unsecured payment instrument may be a payment instrument associated with an account that is not secured by a deposit or is otherwise not associated with a savings account or other account maintained via one or more financial institutions. Graduation of a secured payment instrument to an unsecured payment instrument may include converting the secured payment instrument to an unsecured payment instrument by, for example, removing any previously allocated allowances for the payment instrument, adjusting the credit limit of the payment instrument, updating various credit reporting agencies of the graduation, and other such operations. Graduation of a secured payment instrument to an unsecured payment instrument may also be referred to herein as a promotion of a secured payment instrument to an unsecured payment instrument.

As used herein and unless otherwise made expressly clear, "promotion" of a secured payment instrument to an unsecured payment instrument refers to the systems and methods described herein for graduating a secured payment instrument to an unsecured payment instrument rather than the conventional meaning of "promotion" (e.g., offering an incentive to promote participation or engagement with services associated with the payment instrument).

FIG. 1 shows an illustrative example of an environment 100 in which a payment instrument service 102 evaluates spending data associated with a user 112 to identify a set of allowances to be allocated in order to secure a line of credit associated with a secured payment instrument 118 in accordance with at least one embodiment. In the environment 100, a user 112, through use of a computing device (e.g., smartphone, tablet computer, desktop computer, etc.), may submit an application or other request to a payment instrument application system 104 of a payment instrument service 102 to obtain a line of credit associated with a secured payment instrument 118. In an embodiment, the application or other request submitted by the user 112 includes information corresponding to one or more accounts associated with one or more financial institutions 116, such as account credentials (e.g., usernames, passwords, cryptographic tokens, account numbers, routing numbers, etc.) that may be used to access these one or more accounts. Further, the application or other request may include information that may be used to perform a credit inquiry of the user's credit report to determine whether the user 112 is qualified for a line of credit associated with a secured payment instrument 118. For instance, through the application or other request, the user 112 may provide their legal name, birthdate, last four digits of their Social Security number, household income, and the like.

In some instances, the user 112 may be associated with an existing account associated with the payment instrument service 102 (e.g., a third-party payment instrument service, a merchant, etc.). For instance, the user 112 may have an existing account associated with the payment instrument service 102 whereby the user 112 may have one or more existing lines of credit associated with secured and/or unsecured payment instruments. If the user 112 is associated with an existing account associated with the payment instrument service 102, the payment instrument application system 104 may query a user accounts datastore 110 maintained by the payment instrument service 102 to obtain any required information from the user's account that may be used to supplement the application or other request to obtain a new line of credit associated with a secured payment instrument 118. For instance, if the user 112 has previously submitted information corresponding to one or more accounts associated with the one or more financial institutions 116, the payment instrument application system 104 may automatically obtain this information from the user accounts datastore 110. Similarly, the payment instrument application system 104 may obtain, from the user accounts datastore 110, any user information that may be used to perform the credit inquiry of the user's credit report.

In some instances, the user 112 may not have a pre-existing relationship with the payment instrument service 102. For instance, the user 112 may be a new customer that is interested in establishing a new line of credit through the payment instrument service 102. As an illustrative example, the user 112 may be presented with advertisements related to the payment instrument service 102, whereby the user 112 may be presented with different payment instrument options, including an option for a secured payment instrument 118, that may generally be available from the payment instrument service 102. These advertisements may be presented in the form of billboards, radio media, television or digital video media, banner advertisements, pop-up advertisements, and the like. In response to these advertisements, the user 112 may access the payment instrument service 102 to submit an application or other request to determine whether the user 112 is eligible for the secured payment instrument 118 offered by the payment instrument service 102.

The payment instrument service 102, in an embodiment, is a service that, for example, processes applications for secured payment instruments, issues secured payment instruments, determines user-specific allowances to secure the secured payment instruments, processes transactions associated with secured payment instruments, determines whether a secured payment instrument should be graduated to an unsecured payment instrument, processes the graduation of the secured payment instrument to an unsecured payment instrument, issues unsecured payment instruments, processes transactions associated with unsecured payment instruments, processes cancellations of accounts associated with secured and unsecured payment instruments, and performs other such operations. In an embodiment, the dual-feature payment instrument service 102 is a service such as the service 812 described herein at least in connection with FIG. 8. In an embodiment, the payment instrument service 102 is a service provided by a merchant such as the merchants described herein at least in connection with FIG. 8. In an embodiment, the payment instrument service 102 is a service provided by a computing resources provider such as the computing resource provide 828 described herein at least in connection with FIG. 8 (e.g., a service such as service 830 and/or service 832 described herein at least in connection with FIG. 8). In an embodiment, the dual-feature payment instrument service 102 is a payment instrument service such as the payment instrument service 838 described herein at least in connection with FIG. 8. In some instances, the payment instrument service 102 may be a service operated by the issuer of the secured payment instrument and/or the unsecured payment instrument. In some instances, the payment instrument service 102 may be a service operated by a third-party on behalf of the issuer of the secured payment instrument and/or the unsecured payment instrument.

The payment instrument application system 104 may be implemented using a computer system of the payment instrument service 102. In some instances, the payment instrument application system 104 may be implemented as an application or executable process that is executed on a computer system of the payment instrument service 102. In an embodiment, if the user 112 has provided a set of credentials corresponding to an existing account associated with the payment instrument service 102, the payment instrument application system 104 may authenticate the provided set of credentials to ensure that the set of credentials correspond to the existing account and that the user 112 is authorized to access this existing account. If the set of credentials are successfully authenticated, the payment instrument application system 104 may access the user accounts datastore 110 to retrieve any information required for a credit inquiry of the user's credit report, as well as any information that may be used to access one or more other accounts associated with one or more financial institutions 116, from the user's existing account. If the user 112 does not have an existing account associated with the payment instrument service 102, the payment instrument application system 104 may forego this process of accessing the user accounts datastore 110 to retrieve the required information from an existing account.

In an embodiment, the payment instrument application system 104 provides the provided application or other request, as well as any information garnered from the user accounts datastore 110, to an allowance allocation system 106 of the payment instrument service 102. The allowance allocation system 106 may be implemented using a computer system of the payment instrument service 102. In some instances, the allowance allocation system 106 may be implemented as an application or executable process that is executed on a computer system of the payment instrument service 102. In an embodiment, the allowance allocation system 106 automatically submits a credit inquiry to a credit reporting service 114 to obtain a credit evaluation for the user 112. For instance, the result of credit inquiry may include one or more credit scores associated with the user 112, the current amount of credit allocated to the user 112 from different financial entities (including the payment instrument service 102, if any), the current amount of credit available to the user 112, and the like. The credit reporting service 114 may be associated with one or more credit agencies (e.g., Equifax®, TransUnion®, Experian®, etc.) or may otherwise interact with one or more credit agencies to provide credit reporting to users and other entities (such as the allowance allocation system 106).

In addition to obtaining a credit evaluation for the user 112, the allowance allocation system 106 may automatically access one or more financial institutions 116 to obtain spending data associated with one or more accounts maintained by these one or more financial institutions 116 on behalf of the user 112. The one or more financial institutions 116 may include one or more banks, credit unions, investment management companies, and the like. These one or more financial institutions 116 may provide users (such as user 112) with different types of accounts, such as saving accounts, checking accounts, brokerage accounts, investment accounts, and the like. To automatically access an account associated with the user 112 and maintained by a financial institution 116, the allowance allocation system 106 may use a corresponding set of credentials (e.g., usernames, passwords, cryptographic tokens, account numbers, routing numbers, etc.) associated with the account. For instance, through an application programming interface (API) call to a financial institution 116, the allowance allocation system 106 may provide the financial institution 116 with the requisite set of credentials needed to access the account associated with the user 112. The financial institution 116 may evaluate the provided set of credentials in order to authenticate the request and determine whether the user 112 has provided the requisite authorization to allow the allowance allocation system 106 to access the account.

If a financial institution 116 grants the allowance allocation system 106 access to an existing account associated with the user 112, the allowance allocation system 106 may automatically obtain account statements or other information that may be used to obtain spending data for the user 112. For instance, the allowance allocation system 106 may submit a request to the financial institution 116 to obtain a set of account statements spanning a particular time period (e.g., past six months, past year, past three years, etc.) that may specify any expenditures associated with the account. For example, an account statement may specify what amounts from the account were used for different spending categories over the statement period (e.g., a given month, etc.), such as housing expenses (e.g., rent payments, mortgage payments, etc.), expenses related to food and other necessities (e.g., grocery expenses, clothing expenses, etc.), medical expenses, entertainment expenses, and the like. These amounts may be categorized automatically by the financial institution 116. Alternatively, these amounts may be uncategorized, with information corresponding to the entity to which payment from the account was made (e.g., merchant name, recipient name, etc.).

In an embodiment, the allowance allocation system 106 implements and dynamically trains a machine learning algorithm or artificial intelligence to identify sets of allowances for new secured payment instruments based on spending data associated with different users' accounts maintained by the one or more financial institutions 116, the different users' credit evaluations, and historical data corresponding to these different users. The machine learning algorithm or artificial intelligence may be dynamically trained in real-time using unsupervised learning techniques. For instance, a dataset of sample spending data, account data, and credit evaluation data (e.g., historical data, hypothetical data, combinations of historical and hypothetical data, etc.) corresponding to sample users (e.g., actual users, hypothetical users, combinations of actual and hypothetical users, etc.) may be analyzed using a clustering or classification algorithm to classify the obtained data according to one or more vectors of similarity between the obtained data and clusters of allowance groupings along different spend categories. In some instances, the dataset may further include historical data corresponding to the allowances allocated to secured payment instruments issued to different users, any adjustments made to these allowances in response to user feedback prior to issuance of the secured payment instruments, any adjustments made to these allowances over time based on usage of the secured payment instruments, and the like. Thus, in some embodiments, the allowance allocation system 106, through the machine learning algorithm or artificial intelligence, can perform such clustering and obtain partial matches among other clusters of allowance groupings according to these one or more vectors of similarity to identify a particular cluster and, from this cluster, identify the allowances that are to be allocated for a new secured payment instrument 118.

As an illustrative example, the allowance allocation system 106 may dynamically train a clustering algorithm to identify, in response to a new application or other request for a new secured payment instrument, and based on one or more vectors (e.g., credit scores, changes in credit scores, spending habits, total amount of credit allocated, total amount of credit available, payment performance, demographic information, etc.) similar accounts and/or account holders associated with previously issued secured payment instruments. These similar accounts and/or account holders may correspond to different allowance allocations based on the one or more vectors.

In an embodiment, the different vectors correspond to input user and account data identified from received secured payment instrument applications, available user accounts, available user credit evaluations, and any available spending data associated with these users. For instance, the one or more vectors may correspond to particular credit score ranges extracted from obtained credit evaluations. Additionally, one or more vectors from the set of vectors may correspond to user or other entity characteristics. For instance, one or more vectors may correspond to demographic information associated with these users including, but not limited to, location (e.g., zip code, etc.), length of credit history, reported income, and the like. These particular vectors may be associated with clusters corresponding to different allowance allocations (e.g., percentages, etc.) along different spending categories.

In an embodiment, to dynamically train the machine learning algorithm or artificial intelligence used to identify different allowance allocations for new secured payment instruments 118, the allowance allocation system 106 generates an initial iteration of the machine learning algorithm or artificial intelligence. For instance, the allowance allocation system 106 may initialize a set of coefficients $\{\alpha1, \alpha2, \alpha3, \ldots \alpha n\}$ randomly according to a Gaussian distribution with low variance centered around zero. Using this initial iteration of the machine learning algorithm or artificial intelligence, the allowance allocation system 106 may process the dataset of sample spending data, account data, and credit evaluation data corresponding to different sample users to generate an output. This output may specify, for each sample set of data corresponding to a sample user included in the dataset, an indication of different spending allowances that may be associated with a new secured payment instrument. The allowance allocation system 106 may compare the output generated using the initial iteration of the machine learning algorithm or artificial intelligence to the sample spending allowances defined in the dataset for each of the data points (e.g., spending data, account data, and credit evaluation data corresponding to different sample users, etc.) to identify any inaccuracies or other errors.

If the output of the machine learning algorithm or artificial intelligence does not satisfy one or more criteria, the allowance allocation system 106 may iteratively update one or more coefficients of the set of coefficients to generate an updated machine learning algorithm or artificial intelligence. For instance, the one or more criteria may include a threshold for the accuracy of the desired machine learning algorithm or artificial intelligence for assigning different spending allowances for secured payment instruments based on received user and spending characteristics. The updated machine learning algorithm or artificial intelligence may be used to process the aforementioned training dataset, as well as any additional data points or other datasets provided by the payment instrument service 102 to generate a new output for each data point in the training dataset. In some instances, the allowance allocation system 106 may use an optimization algorithm to iteratively update the one or more coefficients of the set of coefficients associated with the machine learning algorithm or artificial intelligence. For instance, the allowance allocation system 106 may use gradient descent to update the logistic coefficients of the machine learning algorithm or artificial intelligence to generate new cutoff values that may be used to classify the data points of the previously evaluated dataset and of any new data points obtained by the allowance allocation system 106. The allowance allocation system 106 may use this updated machine learning algorithm or artificial intelligence to process the available data points and generate a new output. The allowance allocation system 106 may evaluate this new output to determine whether the output satisfies the one or more criteria. This process of updating the set of coefficients associated with the machine learning algorithm or artificial intelligence according to the one or more criteria may be performed iteratively until an updated machine learning algorithm or artificial intelligence is produced that satisfies the one or more criteria.

In an embodiment, if the output generated by the machine learning algorithm or artificial intelligence satisfies the one or more criteria, the allowance allocation system 106 implements the machine learning algorithm or artificial intelligence to dynamically, and in real-time, process any received applications or other requests, as well as any information garnered from the user accounts datastore 110 (e.g., spending data, credit histories, etc.) associated with different users (such as user 112) to assign a set of spending allowances for different spending categories for the new secured payment instruments 118 being issued to these different users. In an embodiment, the allowance allocation system 106 uses new spending data and corresponding sets of allowances and lines of credit as these are updated based on this spending data to further retrain or otherwise update the machine learning algorithm or artificial intelligence. For instance, as the machine learning algorithm or artificial intelligence produces, in real-time or near real-time, outputs corresponding to different spending allowances for different secured payment instruments, the allowance allocation system 106 or other evaluator of the machine learning algorithm or artificial intelligence may evaluate the output to determine whether the machine learning algorithm or artificial intelligence is generating appropriate lines of credit, determining sets of spending allowances for these lines of credit, and dynamically updating these lines of credit and/or sets of allowances as the updated spending data is received. This evaluation may result in additional annotated data points that may be used to retrain or otherwise update the machine learning algorithm or artificial intelligence in real-time or near real-time. For instance, if the machine learning algorithm or artificial intelligence assigns a particular line of credit and corresponding spending allowances for a secured payment instrument 118 based on received data, and the user associated with the secured payment instrument 118 defaults on their line of credit (e.g., the machine learning algorithm or artificial intelligence produced an erroneous output), the corresponding data associated with the user may be annotated to indicate that the machine learning algorithm or artificial intelligence has erroneously assigned a line of credit and corresponding spending allowances that were not commiserate with the user's known data (e.g., spending data, credit histories, etc.). Additionally, in some instances, the corresponding data associated with the user may be annotated with the appropriate or expected line of credit and corresponding spending allowances that should have been provided to the user. These annotated data points may be added to the training dataset, which may be used to dynamically retrain or otherwise update the machine learning algorithm or artificial intelligence using the process described above.

In an embodiment, clustering algorithms are trained using sample datasets of characteristics of accounts, users, and/or secured payment instruments to classify accounts, customers, and/or secured payment instruments in order to identify the set of allowances that may be allocated to a new secured payment instrument based on the results of their credit inquiries and spending data. Examples of such clustering algorithms may include, but are not limited to, k-means clustering algorithms, fuzzy c-means (FCM) algorithms, expectation-maximization (EM) algorithms, hierarchical clustering algorithms, density-based spatial clustering of applications with noise (DBSCAN) algorithms, and the like.

It should be noted that the allowance allocation system 106, through the machine learning algorithm or artificial intelligence, can continuously and simultaneously process spending data associated with different users as corresponding secured payment instrument applications submitted by these different users are received. For instance, as the payment instrument application system 104 receives or otherwise obtains different applications for secured payment instruments from different users, as well as any corresponding spending or other account data from the user accounts datastore 110, the payment instrument application system 104 may continuously provide the different applications and corresponding spending or other account data to the allowance allocation system 106 for real-time processing. As these different applications and corresponding spending or other account data is received, the machine learning algorithm or artificial intelligence implemented and dynamically trained by the allowance allocation system 106 may continuously and simultaneously process these different applications and corresponding spending or other account data to select, for each application (i.e., user), what allowances are to be allocated for a new secured payment instrument for the corresponding user. In some instances, the allowance allocation system 106 may be configured with various special-purpose components that can facilitate real-time or near real-time processing of different applications and corresponding spending or other account data as these different applications are received from any number of different users. Further, these various special-purpose components may be configured to automatically and in real-time or near real-time generate a set of allowances for new secured payment instruments through the aforementioned machine learning algorithm or artificial intelligence.

In an embodiment, the allowance allocation system 106 evaluates the obtained spending data from the one or more financial institutions 116 to determine whether additional processing of the spending data is required in order to isolate expenditures across different spending categories. As noted above, account statements from certain financial institutions 116 may be uncategorized, with each transaction corresponding to an entity to which payment from the corresponding account was made. Accordingly, if the allowance allocation system 106 identifies an account statement that has a set of transactions that are uncategorized, the allowance allocation system 106 can apply natural language processing (NLP) or any other text parsing algorithm or executable code to automatically parse the account statement. Through this parsing of the account statement, the allowance allocation system 106 may identify individual transactions, the entity associated with each of these transactions, the associated amount, and whether the transactions correspond to deposits or withdrawals from the account.

The allowance allocation system 106, in some instances, may maintain a database of known entities (e.g., merchants, retailers, lenders, etc.) that may be associated with particular spending categories. For example, an entry in the database corresponding to the merchant "Stop & Shop" may be associated with the spending category "Groceries." As another example, an entry in the database corresponding to "Exxon" may be associated with the spending category "Gas/Automotive." Thus, if the allowance allocation system 106 processes an uncategorized account statement (e.g., one or more transactions have not been categorized by a corresponding financial institution 116), the allowance allocation system 106 may automatically query this database of known entities to determine whether an entity specified for a particular transaction has been previously categorized by another financial institution and/or by the allowance allocation system 106 itself. If the entity has been previously categorized according to a particular spending category, the allowance allocation system 106 may automatically associate the corresponding transaction with this particular spending category.

In an embodiment, the allowance allocation system 106 can automatically create new entries in the database for any entities that are newly identified from obtained account statements. For instance, for each transaction indicated in an account statement, the allowance allocation system 106 may determine whether an entry corresponding to an associated entity is available within the database. If the allowance allocation system 106 determines that no entry exists for the entity, the allowance allocation system 106 may create a new entry associated with the entity in the database. Further, if the transaction corresponding to the entity is associated with a particular spending category (as indicated by a corresponding financial institution 116), the allowance allocation system 106 may automatically update the new entry to associate the entity with this spending category. Thus, if the allowance allocation system 106 obtains an uncategorized transaction that is associated with this entity, the allowance allocation system 106 may refer to the corresponding entry in the database to associate the uncategorized transaction with the spending category specified in the database. Similarly, if the allowance allocation system 106 obtains a categorized transaction that is associated with an entity for which a corresponding entry in the database does not specify a particular spending category for the entity, the allowance allocation system 106 may update this corresponding entry to indicate the particular spending category for the entity. Thus, as new account statements are received for myriad users associated with the payment instrument service 102, the allowance allocation system 106 may dynamically, and in real-time, update the database to provide accurate spending categories for various entities (e.g., merchants, retailers, mortgage brokers, utility companies, etc.).

As noted above, the allowance allocation system 106 may implement and dynamically train a machine learning algorithm or artificial intelligence to automatically identify an amount for the line of credit associated with a secured payment instrument 118, as well as a set of allowances corresponding to different spending categories for the secured payment instrument 118. The set of allowances may correspond to different spending categories for users associated with the payment instrument service 102. For example, the set of allowances may include a utilities allowance (e.g., water, electric, gas, etc.), a housing allowance (e.g., mortgage, rent, etc.), a childcare allowance (e.g., daycare, nannies, babysitting services, etc.), a medical allowance (e.g., doctor's visits, medications, etc.), food and gas allowance (e.g., groceries, gas/petrol for vehicles, etc.), an entertainment or discretionary allowance (e.g., movies, gaming subscriptions, streaming service subscriptions, vacations, etc.), and the like. The output of the machine learning algorithm or artificial intelligence built from existing user accounts, corresponding credit inquiry results, and previously allocated allowances may include an amount for the line of credit that is to be associated with the secured payment instrument 118, as well as an initial allocation of a set of allowances for the secured payment instrument 118.

In an embodiment, the total amount corresponding to the set of allowances identified for the secured payment instrument 118 is equal to the amount of the line of credit that is to be associated with the secured payment instrument 118. For instance, the allowance allocation system 106 may determine, based on the user's credit report evaluation, the amount of the line of credit that may be provided to the user 112. This amount may set a cap for the amount that may be allocated to the set of allowances that are to be defined for the secured payment instrument 118. Thus, the set of allowances for the secured payment instrument 118 may be allocated such that a change to a particular allowance results in an inverse change to one or more other allowances of the set of allowances. As an illustrative example, if the amount of the line of credit is $1,000, the total amount that may be allocated for the set of allowances is $1,000, which may be divided amongst the different allowances corresponding to the different spending categories. If the allowance allocation system 106 allocates $500 of the $1,000 line of credit to a housing allowance, and the user 112 indicates (prior to issuance of the secured payment instrument 118) that the housing allowance should be increased to $550, one or more of the other allowances of the set of allowances allocated to the secured payment instrument 118 may need to be reduced commensurate to the $50 increase to the housing allowance. This may be performed to ensure that the set of allowances do not exceed the line of credit and that no amount of the line of credit is preserved for transactions that do not correspond to any of the set of allowances.

In an embodiment, the allowance allocation system 106 provides the amount of the line of credit and the corresponding allocation of the set of allowances for the secured payment instrument 118 to the payment instrument application system 104. In response, the payment instrument application system 104 may provide the user 112 with information corresponding to the amount of the line of credit and the corresponding allocation of the set of allowances. For instance, if the user 112 submitted their application for a new secured payment instrument 118 through an application or web portal provided by the payment instrument service 102, the payment instrument application system 104 may update a user interface (such as a graphical user interface (GUI)) associated with the application or web portal to present the amount of the line of credit, the corresponding allocation of the set of allowances, and any other information associated with the secured payment instrument 118 (e.g., terms and conditions, interest rates, re-payment schedules, etc.).

In some instances, the user 112 may be provided with an option to adjust the set of allowances identified by the allowance allocation system 106 and prior to issuance of the secured payment instrument 118. Using the illustrative example described above, if the allowance allocation system 106 allocates $500 of the $1,000 line of credit to a housing allowance, the user 112 may select an option to indicate (prior to issuance of the secured payment instrument 118) that the housing allowance should be increased to $550. In response to selection of this option, the allowance allocation system 106 may indicate that one or more of the other allowances of the set of allowances allocated to the secured payment instrument 118 may need to be reduced commensurate to the $50 increase to the housing allowance. The user 112 may thus be prompted to reduce one or more of the other allowances by a total of $50 to offset the increase to the housing allowance. In some instances, the allowance allocation system 106, using the aforementioned machine learning algorithm or artificial intelligence, may automatically generate a recommendation for reallocation of the set of allowances in response to the change in an allowance submitted by the user 112. For example, if the user 112 indicates that they want to increase their housing allowance by $50, the allowance allocation system 106 may recommend a commensurate reduction to the user's entertainment or discretionary allowance. As another illustrative example, if the allowance allocation system 106 determines, based on the spending data associated with the user 112, that the user's food and gas expenditures have been decreasing over time, the allowance allocation system 106 may recommend a reduction to the user's food and gas allowance while providing a sufficient amount in the food and gas allowance for the user's predicted needs.

In an embodiment, the ability to adjust the set of allowances identified by the allowance allocation system 106 can be defined based on the credit report evaluation. For example, the adjustments that may be made to the set of allowances may be proportional to the user's credit scores, whereby a higher set of credit scores may result in the user 112 being granted greater freedom in adjusting the set of allowances identified by the allowance allocation system 106. Alternatively, a lower set of credit scores may result in a greater restriction, or outright removal, of the option to adjust the set of allowances identified by the allowance allocation system 106.

Once the user 112 has agreed to the terms and conditions, as well as to the line of credit and corresponding set of allowances, the payment instrument application system 104 may issue the secured payment instrument 118 to the user 112. As noted above, this secured payment instrument 118 may be secured using the set of allowances allocated by the allowance allocation system 106 and the user's one or more accounts maintained by corresponding financial institutions 116 and that may be linked to the secured payment instrument 118 (e.g., checking accounts, savings accounts, brokerage accounts, etc.). However, the user 112 may not be required to hold any amount from their one or more accounts in escrow to serve as a deposit for the secured payment instrument 118. Thus, the user 112 may have additional flexibility with regard to their one or more accounts while being subject to the set of allowances allocated to the secured payment instrument 118.

In an embodiment, the allowance allocation system 106 monitors the account associated with the secured payment instrument 118 in real-time as transactions occur in order to determine whether to update the set of allowances allocated to the secured payment instrument 118 and/or to update the line of credit associated with the secured payment instrument 118. For instance, the allowance allocation system 106 may dynamically track, in real-time or near real-time, the credit performance of the user 112 and of other users in order to update the dataset used to train the machine learning algorithm or artificial intelligence implemented by the allowance allocation system 106. This dataset may be updated based on the ongoing and real-time performance of users with regard to their secured payment instruments and according to the sets of allowances established for these secured payment instruments. For example, as users utilize their secured payment instruments for different transactions, make payments towards existing balances associated with these secured payment instruments, and/or as changes are otherwise made to these users' credit histories, the dataset may be updated in real-time accordingly. These dynamic, and real-time updates to the dataset used to train the machine learning algorithm or artificial intelligence implemented by the allowance allocation system 106 may allow for the continuous and dynamic updating of this machine learning algorithm or artificial intelligence in real-time, thereby improving the performance of the machine learning algorithm or artificial intelligence in updating the amount of the line of credit associated with a secured payment instrument 118, as well as dynamically updating the set of allowances according to the update to the amount of the line of credit.

As an illustrative example, if the amount of a line of credit associated with the secured payment instrument 118 is increased from $1,000 to $1,500 based on the user's improvement in their credit scores and the continued positive maintenance of their secured payment instrument 118 (e.g., making timely payments, infrequently hitting the maximum allowable amounts for different allowance limits, etc.), the allowance allocation system 106 may automatically update the set of allowances such that the total amount corresponding to the set of allowances is increased from $1,000 to $1,500. Further, the increase in the set of allowances may be distributed in proportion to the previous allocation of the set of allowances. For example, if a housing allowance was previously set at $500 or 50% of the total line of credit, the increase in the amount of the line of credit to $1,500 may cause the allowance allocation system 106 to increase the housing allowance from $500 to $750, maintaining the 50% allocation from the total line of credit.

In an embodiment, if the allowance allocation system 106 determines that the line of credit is to be increased as a result of the user's improvement in their credit scores and the continued positive maintenance of their secured payment instrument 118, the allowance allocation system 106 may maintain the original amount allocations for the set of allowances while allowing the user 112 to use the remaining amount of the increased line of credit for any transactions desired by the user 112. For example, if the amount of a line of credit associated with the secured payment instrument 118 is increased from $1,000 to $1,500, and the original amount allocations for the set of allowances corresponds to the original credit limit of $1,000, the $500 added to the line of credit may not be subject to the set of allowances such that the user 112 may utilize this amount for any transactions that may otherwise exceed the originally defined set of allowances.

In an embodiment, if the allowance allocation system 106 determines that the line of credit is to be increased as a result of the user's improvement in their credit scores and the continued positive maintenance of their secured payment instrument 118, the allowance allocation system 106 may re-allocate the set of allowances according to any newly identified trends in the user's updated spending data and trends derived from spending data for similarly situated users. For example, the allowance allocation system 106 may evaluate the user's spending data corresponding to use of the secured payment instrument 118 and of any accounts maintained by the one or more financial institutions 116 to determine whether the user's historical spending has shifted along one or more spending categories. For example, if the user's rent has increased, resulting in the user 112 having to spend more on housing expenses, the allowance allocation system 106 may dynamically adjust the set of allowances associated with the secured payment instrument 118 to increase the housing allowance for the user 112 while reducing any of the other allowances based on the shift in the user's historical spending. In some examples, the allowance allocation system 106 may use the updated spending data for the user 112 as input to the machine learning algorithm or artificial intelligence to identify a cluster of similarly situated users or accounts according to one or more vectors of similarity corresponding to features of the updated spending data (e.g., transactions and associated amounts along different spending categories, changes to spending along different spending categories over time, credit performance, payment performance, demographic information, etc.). From this cluster of similarly situated users, the allowance allocation system 106 may determine the historical set of allowances allocated to secured payment instruments issued to these users. This historical set of allowances may be compared to the present set of allowances allocated to the secured payment instrument 118 to identify any changes that may be made to the set of allowances. Thus, as the user 112 utilizes the issued secured payment instrument 118 over time, the allowance allocation system 106 can dynamically, and in real-time, adjust the amount of the user's line of credit and corresponding set of allowances.

In an embodiment, the machine learning algorithm or artificial intelligence implemented by the allowance allocation system 106 is configured and dynamically trained to simultaneously process, in real-time, multiple applications or requests for secured payment instruments, corresponding credit inquiry results for various users, and these users' spending data in order to provide tailored lines of credit and corresponding sets of allowances for different secured payment instruments that may be offered to these users. This may allow the allowance allocation system 106 to process numerous applications or other requests at the same time without creating a backlog that may hinder the user experience. Further, the allowance allocation system 106 can dynamically, and in real-time, update the dataset used to train the machine learning algorithm or artificial intelligence as updated spending data is obtained and corresponding sets of allowances and lines of credit are updated based on this spending data. This may allow for the continuous and dynamic updating of the machine learning algorithm or artificial intelligence in real-time, thereby improving the performance of the machine learning algorithm or artificial intelligence in determining lines of credit, determining sets of allowances for these lines of credit, and in dynamically updates these lines of credit and/or sets of allowances as updated spending data is received.

In an embodiment, the allowance allocation system 106 automatically provides allowance data corresponding to the secured payment instrument 118 to a graduation system 108 of the payment instrument service 102. The allowance data may be provided in real-time and may include the user's spending data as transactions occur using the secured payment instrument 118 and any accounts associated with the one or more financial institutions 116. Further, the allowance data may include any changes to the set of allowances and/or credit limit associated with the secured payment instrument 118. In some instances, the allowance data may further include any credit reporting information associated with the user 112, including the user's present credit scores and any changes to these credit scores over time. Using this allowance data, the graduation system 108 may monitor, in real-time, the user's usage of the issued secured payment instrument 118 to determine whether to communicate an offer of graduation to the user 112.

The graduation system 108 may be implemented using a computer system of the payment instrument service 102. In some instances, the graduation system 108 may be implemented as an application or executable process that is executed on a computer system of the payment instrument service 102. In an embodiment, the graduation system 108 implements and dynamically trains a machine learning algorithm or artificial intelligence to determine whether a secured payment instrument should be graduated to an unsecured payment instrument and/or to trigger the processing of the graduation of the secured payment instrument to an unsecured payment instrument. The machine learning algorithm or artificial intelligence may be dynamically trained in real-time using unsupervised learning techniques to identify similar accounts, account holders (e.g., other users), and/or secured payment instruments based on one or more vectors (e.g., spending habits, credit limits, payment performance, demographic information, credit scores, changes in credit scores, sets of allowances, changes to sets of allowances, etc.). For instance, a dataset of sample accounts, users (e.g., account holders), and corresponding spending data may be analyzed using a clustering algorithm may be classified according to one or more vectors of similarity between the sample data and clusters of graduation groupings (e.g., clusters corresponding to different graduation determinations) to determine whether the secured payment instrument 118 should be graduated to an unsecured payment instrument 120 and/or to trigger the processing of the graduation of the secured payment instrument 118 to an unsecured payment instrument 120. Thus, in some embodiments, the graduation system 108, through the machine learning algorithm or artificial intelligence, can perform such clustering and obtain partial matches among other clusters of graduation groupings according to these one or more vectors of similarity to identify a particular cluster and, from this cluster, determine whether the secured payment instrument 118 should be graduated to an unsecured payment instrument 120 and/or to trigger the processing of the graduation of the secured payment instrument 118 to an unsecured payment instrument 120.

In an embodiment, to dynamically train the machine learning algorithm or artificial intelligence used to make graduation determinations for existing secured payment instruments, the graduation system 108 generates an initial iteration of the machine learning algorithm or artificial intelligence. For instance, the graduation system 108 may initialize a set of coefficients $\{\alpha 1, \alpha 2, \alpha 3, \ldots \alpha n\}$ randomly according to a Gaussian distribution with low variance centered around zero. Using this initial iteration of the machine learning algorithm or artificial intelligence, graduation system 108 may process the dataset of sample s of sample accounts, users (e.g., account holders), and corresponding spending data to generate an output. This output may specify, for each sample set of data corresponding to a sample user included in the dataset, a determination as to whether a corresponding secured payment instrument should be graduated to an unsecured payment instrument and/or whether to trigger the processing of the graduation of the secured payment instrument to an unsecured payment instrument. The graduation system 108 may compare the output generated using the initial iteration of the machine learning algorithm or artificial intelligence to the sample graduation determinations defined in the dataset for each of the data points to identify any inaccuracies or other errors.

If the output of the machine learning algorithm or artificial intelligence does not satisfy one or more criteria, the graduation system 108 may iteratively update one or more coefficients of the set of coefficients to generate an updated machine learning algorithm or artificial intelligence. For instance, the one or more criteria may include a threshold for the accuracy of the desired machine learning algorithm or artificial intelligence for graduation determinations for different secured payment instruments. The updated machine learning algorithm or artificial intelligence may be used to process the aforementioned training dataset, as well as any additional data points or other datasets provided by the payment instrument service 102 to generate a new output for each data point in the training dataset. In some instances, the graduation system 108 may use an optimization algorithm to iteratively update the one or more coefficients of the set of coefficients associated with the machine learning algorithm or artificial intelligence. For instance, the graduation system 108 may use gradient descent to update the logistic coefficients of the machine learning algorithm or artificial intelligence to generate new cutoff values that may be used to classify the data points of the previously evaluated dataset and of any new data points obtained by the graduation system 108. The graduation system 108 may use this updated machine learning algorithm or artificial intelligence to process the available data points and generate a new output. The graduation system 108 may evaluate this new output to determine whether the output satisfies the one or more criteria. This process of updating the set of coefficients associated with the machine learning algorithm or artificial intelligence according to the one or more criteria may be performed iteratively until an updated machine learning algorithm or artificial intelligence is produced that satisfies the one or more criteria.

In an embodiment, if the output generated by the machine learning algorithm or artificial intelligence satisfies the one or more criteria, the graduation system 108 implements the machine learning algorithm or artificial intelligence to dynamically, and in real-time, process any allowance data (as described above) associated with different secured payment instruments to determine whether these secured payment instruments should be graduated to unsecured payment instruments and/or to trigger the processing of the graduation of the secured payment instruments to unsecured payment instruments. In an embodiment, the graduation system 108 uses new allowance data, graduation determinations, and subsequent account data corresponding to the secured and unsecured payment instruments (e.g., updated credit histories, updated spending data, data indicating defaults or delinquencies, etc.) to further retrain or otherwise update the machine learning algorithm or artificial intelligence. For instance, as the machine learning algorithm or artificial intelligence produces, in real-time or near real-time, outputs corresponding to different graduation determinations for different secured payment instruments, the graduation system 108 or other evaluator of the machine learning algorithm or artificial intelligence may evaluate the output to determine whether the machine learning algorithm or artificial intelligence is generating appropriate graduation determinations for each of these secured payment instruments. This evaluation may result in additional annotated data points that may be used to retrain or otherwise update the machine learning algorithm or artificial intelligence in real-time or near real-time. For instance, if the machine learning algorithm or artificial intelligence indicates that a secured payment instrument 118 should be graduated to an unsecured payment instrument 120 based on received allowance data, and the user subsequently defaults on their line of credit (e.g., the machine learning algorithm or artificial intelligence produced an erroneous output), the corresponding data associated with the user may be annotated to indicate that the machine learning algorithm or artificial intelligence has erroneously determined that the user's secured payment instrument 118 should have been graduated to an unsecured payment instrument 120. Additionally, in some instances, the corresponding data associated with the user may be annotated with the appropriate graduation determination that should have been generated. These annotated data points may be added to the training dataset, which may be used to dynamically retrain or otherwise update the machine learning algorithm or artificial intelligence using the process described above.

Based on the output of the machine learning algorithm or artificial intelligence implemented by the graduation system 108, the graduation system 108 may determine whether the secured payment instrument 118 should be graduated to an unsecured payment instrument 120 and/or whether to trigger the processing of the graduation of the secured payment instrument 118 to an unsecured payment instrument 120. If the graduation system 108 determines that the secured payment instrument 118 is eligible for graduation to an unsecured payment instrument 120, the graduation system 108 may prompt the user 112 to provide a response as to whether the user 112 wishes to have the secured payment instrument 118 graduated to an unsecured payment instrument 120. In an embodiment, the offer for graduation includes information such as the terms for the graduation, an interest rate of the unsecured payment instrument 120, a credit limit of the unsecured payment instrument 120, when the graduation will be effective, whether the graduation is automatically accepted or automatically rejected based on no response by a certain date, and other such information.

If the user 112 opts to accept the offer to graduate the secured payment instrument 118 to an unsecured payment instrument 120, the graduation system 108 may complete graduation of the secured payment instrument 118 to the unsecured payment instrument 120. For instance, the graduation system 108 may update the user account associated with the secured payment instrument 118 to remove the set of allowances associated with the secured payment instrument 118 and transfer any existing balances to the line of credit associated with the unsecured payment instrument 120. Further, the graduation system 108 may issue the unsecured payment instrument 120 to the user 112. For instance, the graduation system 108 may provide a new unsecured payment instrument 120 (a physical payment instrument, a virtual payment instrument, etc.) to the user 112 to replace the previously issued secured payment instrument 118. In some instances, the graduation system 108 may automatically convert the secured payment instrument 118 to an unsecured payment instrument 120.

In an embodiment, the user's response to the offer to graduate the secured payment instrument 118 to an unsecured payment instrument 120 may be used to update, or otherwise retrain, the machine learning algorithm or artificial intelligence implemented by the graduation system 108. For example, if the user 112 accepts the offer to graduate the secured payment instrument 118 to an unsecured payment instrument 120, the graduation system 108 may use this acceptance as an indication that the machine learning algorithm or artificial intelligence has made an accurate determination as to the eligibility for graduation and to the likelihood of the user 112 accepting the offer. Alternatively, if the user 112 rejects the offer to graduate the secured payment instrument 118 to an unsecured payment instrument 120, the graduation system 108 may use this rejection as an indication that the machine learning algorithm or artificial intelligence has made an inaccurate determination as to the eligibility for graduation and to the likelihood of the user 112 accepting the offer. Thus, a response to the offer for graduation that either accepts or rejects the offer for graduation may be used to update aspects of the machine learning algorithm or artificial intelligence. Similarly, other aspects of the response to the offer for graduation (e.g., the amount of time, comments made by the user 112, any other feedback, etc.) may be used to update aspects of the machine learning algorithm or artificial intelligence.

In an embodiment, the graduation system 108 may continuously, and in real-time, monitor the user account associated with the unsecured payment instrument 120 in order to obtain data that may be used by the allowance allocation system 106 to determine amounts for lines of credit associated with secured payment instruments and to determine corresponding allowances for these lines of credit. For example, as users utilize their unsecured payment instruments for different transactions, the graduation system 108 may provide this spending data, in real-time, to the allowance allocation system 106. The allowance allocation system 106 may use this spending data to determine, in real-time, the spending habits of these users according to the different spending categories defined by the allowance allocation system 106. As noted above, the allowance allocation system 106 may use a machine learning algorithm or artificial intelligence to automatically identify sets of allowances for different secured payment instruments based on the spending data associated with applicants (e.g., users applying for secured payment instruments), their respective credit evaluations, and historical data corresponding to these applicants and other users associated with the payment instrument service 102. This historical data may be continuously updated in real-time to incorporate the spending habits of these other users, as determined using the spending data obtained by the graduation system 108.

It should be noted that while machine learning algorithms and artificial intelligence are described extensively throughout the present disclosure for the purpose of illustration, other classical algorithms or systems that do not require training may be implemented to simultaneously process, in real-time, multiple applications for secured payment instruments, to determine the sets of allowances for these secured payment instruments, and to determine whether graduate these secured payment instruments to unsecured payment instruments. For instance, the allowance allocation system 106 may implement an algorithm or other executable code that may continuously process incoming applications and corresponding credit inquiry results and spending data according to one or more formulae to determine the amounts for lines of credit and corresponding amounts for the sets of allowances according to various spending categories. This algorithm or other executable code may be manually updated as determinations are made using the algorithm or other executable code and as user performance with regard to maintenance of their payment instruments is obtained (e.g., changes to credit scores, changes to payment histories, changes to spending habits, etc.).

Figure 2:
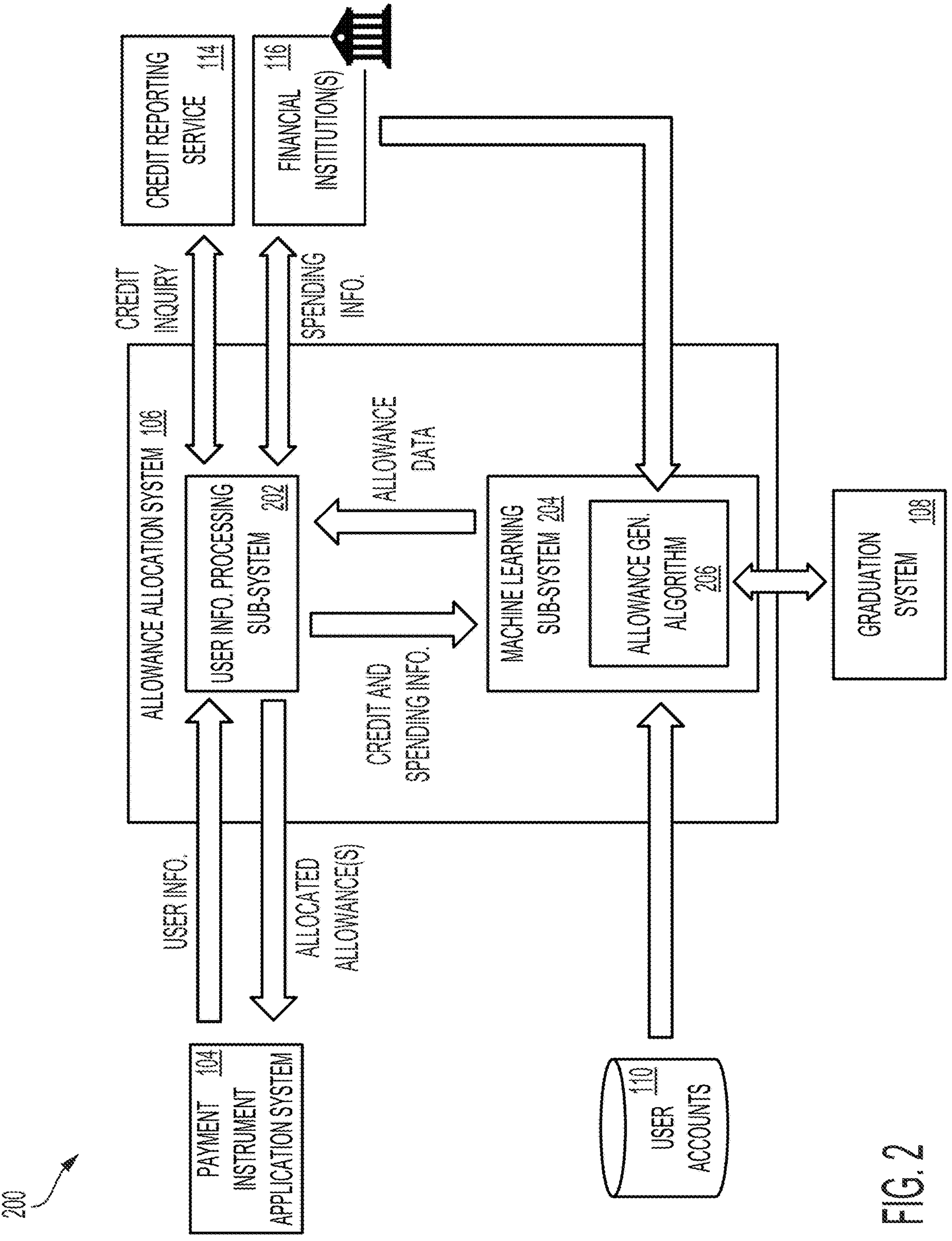
FIG. 2 shows an illustrative example of an environment in which an allowance allocation system processes a credit history and spending information associated with a user in order to identify a set of allowances to be allocated in order to secure a line of credit associated with a secured payment instrument in accordance with at least one embodiment.

FIG. 2 shows an illustrative example of an environment 200 in which an allowance allocation system 106 processes a credit history and spending information associated with a user in order to identify a set of allowances to be allocated in order to secure a line of credit associated with a secured payment instrument in accordance with at least one embodiment. In the environment 200, the payment instrument application system 104 may provide an application or other request for a new line of credit associated with a secured payment instrument to a user information processing subsystem 202 of the allowance allocation system 106. The application or other request may include user information associated with a user applying for the new line of credit. This user information may include information corresponding to one or more accounts associated with one or more financial institutions 116, such as account credentials (e.g., usernames, passwords, cryptographic tokens, account numbers, routing numbers, etc.) that may be used to access these one or more accounts. Further, the user information may include information that may be used to perform a credit inquiry of the user's credit report to determine whether the user 112 is qualified for a new line of credit associated with a secured payment instrument. For instance, user information may include the user's legal name, birthdate, last four digits of their Social Security number, household income, and the like. In some instances, if the user is associated with an existing account associated with the payment instrument service, the user information may include user credentials or identifiers corresponding to the existing account (e.g., username, passwords, cryptographic tokens, etc.).

In response to receiving the application or other request, including the user information, the user information processing sub-system 202 may submit a request to a credit reporting service 114 to perform a credit inquiry of the user's credit report. The credit reporting service 114, in response to the credit inquiry, may provide the user information processing sub-system 202 with data that may be used to determine the user's credit performance over time. This data, for instance, may include one or more credit scores associated with the user, the current amount of credit allocated to the user from different financial entities (including the payment instrument service, if any), the current amount of credit available to the user, the user's credit repayment history, any known delinquencies, and the like.

In an embodiment, the user information processing sub-system 202 further uses the provided user information to access one or more other accounts associated with the user and maintained by one or more financial institutions 116. As noted above, the one or more financial institutions 116 may include one or more banks, credit unions, investment management companies, and the like. These one or more financial institutions 116 may provide users with different types of accounts, such as saving accounts, checking accounts, brokerage accounts, investment accounts, and the like. The user information processing sub-system 202 may automatically access an account associated with the user and maintained by a financial institution 116 by using a corresponding set of credentials provided by the user through their application or other request, or as identified from a user account associated with the payment instrument service (e.g., from the user accounts datastore 110). In some examples, to automatically access an account maintained by a financial institution 116, the user information processing sub-system 202 may transmit an API call to a computer system of the financial institution 116. This API call may include the requisite credentials (as provided through the application/request or obtained from the user accounts datastore 110) needed to access the account associated with the user. The financial institution 116 may authenticate the provided set of credentials and, if valid, determine whether the user has provided the requisite authorization for the user information processing sub-system 202 to access the account.

From an account associated with a user and maintained by a financial institution 116, the user information processing sub-system 202 may automatically obtain user account statements or other information that may be used to obtain spending data for the user 112 over a pre-defined period of time (e.g., three months, six months, one year, three years, etc.). The user account statements or other information may specify the various transactions and corresponding amounts withdrawn from the user's account over time. Further, the user account statements or other information may categorize these transactions and corresponding amounts according to different spending categories, such as housing expenses, expenses related to food and other necessities, medical expenses, entertainment or discretionary expenses, childcare expenses, and the like. This categorization of transactions may be performed automatically by a financial institution 116. In some instances, the user account statements or other information may be uncategorized, whereby an entry for a particular transaction may indicate the entity to which an amount from the account was provided (e.g., a retailer, a merchant, etc.). As described in further detail herein, any uncategorized spending data may be processed by the allowance allocation system 106 in order to categorize each uncategorized transaction according to one of a set of spending categories.

In an embodiment, the user information processing sub-system 202 transmits the data obtained by the user information processing sub-system 202 from the credit reporting service 114 and the one or more financial institutions 116 to a machine learning sub-system 204 of the allowance allocation system 106 to determine an amount for a new line of credit that may be offered to the user, as well as a set of allowances corresponding to different spending categories. The machine learning sub-system 204 may be implemented using a computer system of the allowance allocation system 106. In some instances, the machine learning sub-system 204 may be implemented as an application or executable process that is executed on a computer system of the allowance allocation system 106.

The machine learning sub-system 204, in an embodiment, implements an allowance generation algorithm 206 that is configured to automatically, and dynamically, determine an amount for a new line of credit associated with a secured payment instrument. Further, the allowance generation algorithm 206 may be configured to automatically, and dynamically, generate a set of allowances corresponding to different spending categories. In some instances, the allowance generation algorithm 206 is further configured to dynamically adjust the set of allowances in real-time as updated spending data for the user is obtained (e.g., as the user utilizes the secured payment instrument and any other accounts associated with the one or more financial institutions 116 for various transactions). The allowance generation algorithm 206, in an embodiment, is a machine learning algorithm or artificial intelligence that is dynamically trained to determine an amount for the new line of credit associated with a secured payment instrument and to determine a corresponding set of allowances that may be used to secure the new line of credit. For instance, the allowance generation algorithm 206 may be implemented using a clustering algorithm that is trained to identify similar accounts and/or users based on one or more vectors of similarity (e.g., credit scores, changes in credit scores, spending habits, spending trends across different spending categories, total amount of credit allocated, total amount of credit available, payment performance, demographic information, etc.). These similar accounts and/or users may correspond to different secured payment instruments issued to these users, as well as to the allowances allocated to these secured payment instruments based on the one or more vectors of similarity.

In some instances, a dataset of characteristics of accounts and users may be analyzed using a clustering algorithm to determine the amount for the new line of credit and the set of allowances to be used to secure the new line of credit. The dataset of characteristics of accounts and users may, in an embodiment, include historical data corresponding to the spending data associated with these users (including spending data used to determine the initial sets of allowances and subsequent spending data used to dynamically adjust the sets of allowances in real-time), any adjustments made to the sets of allowances by these users prior to issuance of secured payment instruments to these users, adjustments made to the sets of allowances over time based on updated spending data, graduation determinations made based on usage of the secured payment instruments over time, and any spending data obtained after graduation. Thus, the allowance generation algorithm 206 may be trained using sample datasets of characteristics of accounts, users, and/or secured payment instruments to classify accounts, customers, and/or secured payment instruments in order to determine amounts corresponding to new lines of credit and sets of allowances to secure these new lines of credit based on the results of the users' credit inquiries and spending data. These sample datasets may be generated based on information stored in the user accounts datastore 110.

In an embodiment, the allowance generation algorithm 206 is further configured to evaluate the obtained spending data from the one or more financial institutions 116 to determine whether additional processing of the spending data is required in order to categorize the different transactions or expenditures across different spending categories. As noted above, account statements from certain financial institutions 116 may be uncategorized, with each transaction corresponding to an entity to which payment from the corresponding account was made. Accordingly, if the allowance generation algorithm 206 identifies an account statement that has a set of transactions that are uncategorized, the allowance generation algorithm 206 can automatically parse the account statement. Through this parsing of the account statement, the allowance generation algorithm 206 may identify individual transactions, the entity associated with each of these transactions, the associated amount, and whether the transactions correspond to deposits or withdrawals from the account. Further, for each of these individual transactions, the allowance generation algorithm 206 may assign a corresponding spending category to the transaction based on the entity associated with the transaction (e.g., a merchant, a retailer, a lender, etc.) and/or other characteristics associated with the transaction (e.g., user memos associated with the transactions, etc.).

As noted above, the allowance allocation system 106 may maintain a database of known entities (e.g., merchants, retailers, lenders, etc.) that may be associated with particular spending categories. If the spending data includes any uncategorized transactions, the allowance generation algorithm 206 may automatically query this database of known entities to determine whether an entity specified for a particular transaction has been previously categorized by another financial institution and/or by the allowance generation algorithm 206 during a prior processing of spending data for other users. If the entity has been previously categorized according to a particular spending category, the allowance generation algorithm 206 may automatically associate the corresponding transaction with this particular spending category.

The allowance generation algorithm 206 may also automatically create new entries in the aforementioned database for any entities that have been newly identified from the obtained spending data. For instance, for each transaction indicated in the obtained spending data, the allowance generation algorithm 206 may determine whether an entry corresponding to an associated entity is available within the database. If the allowance generation algorithm 206 determines that no entry exists for the entity, the allowance generation algorithm 206 may automatically create a new entry associated with the entity in the database. Further, if the transaction corresponding to the entity is associated with a particular spending category, the allowance generation algorithm 206 may automatically update the new entry to associate the entity with this spending category. Thus, if the allowance generation algorithm 206 obtains an uncategorized transaction that is associated with this entity, the allowance generation algorithm 206 may refer to the corresponding entry in the database to associate the uncategorized transaction with the spending category specified in the database. Similarly, if the allowance generation algorithm 206 obtains a categorized transaction that is associated with an entity for which a corresponding entry in the database does not specify a particular spending category for the entity, the allowance generation algorithm 206 may dynamically update this corresponding entry to indicate the particular spending category for the entity. Thus, as new spending data is received for myriad users associated with the payment instrument service, the allowance generation algorithm 206 may dynamically, and in real-time, update the database to provide accurate spending categories for various entities.

In an embodiment, the machine learning sub-system 204 uses the result of the credit inquiry, the spending data from the one or more financial institutions 116 and/or from the user's existing accounts associated with the payment instrument service, and historical data corresponding to the user and other users associated with the payment instrument service as input to the allowance generation algorithm 206 to determine the amount of the new line of credit for the applied for secured payment instrument and to generate a set of allowances that may be used to secure the new line of credit. For instance, the allowance generation algorithm 206 may use the result of the credit inquiry associated with the user and the user's spending data to automatically identify a cluster of similarly situated users according to one or more vectors of similarity corresponding to features of the credit inquiry result and the spending data (e.g., credit scores, changes in credit scores, spending habits, spending trends across different spending categories, total amount of credit allocated, total amount of credit available, payment performance, demographic information, etc.). From this cluster of similarly situated users, the allowance generation algorithm 206 can identify a dataset that indicates characteristics of the lines of credit issued to these similarly situated users (e.g., an amount associated with a line of credit, the terms and conditions associated with a line of credit, etc.), as well as the allowance allocations for these lines of credit. The dataset may further indicate these users' management of the payment instruments issued to these users (e.g., repayment history, delinquency history, default history, etc.), changes made to the allowances allocated to these payment instruments over time, changes made to these users' spending data over time, and offers provided to these users to graduate their payment instruments. Based on this dataset, the allowance generation algorithm 206 may determine, for the user, the amount for a new line of credit and a corresponding set of allowances that may be used to secure the new line of credit.

In an embodiment, in addition to determining the amount for the new line of credit and the corresponding set of allowances, the allowance generation algorithm 206 can determine whether to provide the user with an option to adjust the set of allowances by a particular amount. This determination to provide the user with this option and the amount by which the user may adjust the set of allowances may performed by the allowance generation algorithm based on the result of the credit inquiry. For example, the adjustments that may be made to the set of allowances may be proportional to the user's credit scores, whereby a higher set of credit scores may result in the user being granted greater freedom in adjusting the set of allowances identified by the allowance generation algorithm 206. Alternatively, a lower set of credit scores may result in a greater restriction, or outright removal, of the option to adjust the set of allowances identified by the allowance generation algorithm 206.

An option to adjust the set of allowances may indicate a particular range or amount by which the user may adjust particular allowances from the set of allowances. For instance, for a particular set of allowances, the allowance generation algorithm 206 may define the amount by which the user may adjust each allowance of the set of allowances. As an illustrative example, the allowance generation algorithm 206 may allow a user to adjust their housing allowance by at most $50 (increase or decrease), adjust their food and gas allowance by at most $50 (increase or decrease), adjust their entertainment or discretionary allowance by at most $20 (increase or decrease), and the like. However, any changes made to an allowance may require a corresponding inverse change to another allowance of the set of allowances in order to ensure that the total amount corresponding to the set of allowances is equal to the total amount of the line of credit.

In an embodiment, the allowance generation algorithm 206 provides, to the user information processing sub-system 202, allowance data that can be provided to the user. The allowance data may indicate the amount of the new line of credit, the set of allowances defined to secure the new line of credit, and any options to adjust the set of allowances prior to issuance of a new secured payment instrument corresponding to the new line of credit. The user information processing sub-system 202 may provide this allowance data to the payment instrument application system 104. As noted above, the payment instrument application system 104 may provide the user with information corresponding to the amount of the line of credit and the corresponding allocation of the set of allowances. For instance, if the user submitted their application for a new secured payment instrument through an application or web portal provided by the payment instrument service, the payment instrument application system 104 may update a user interface associated with the application or web portal to present the amount of the line of credit, the corresponding allocation of the set of allowances, and any other information associated with the secured payment instrument (e.g., terms and conditions, interest rates, re-payment schedules, etc.). Additionally, if the allowance generation algorithm 206 has provided an option to adjust the set of allowances, the payment instrument application system 104, through this interface, may provide the user with the option to adjust the set of allowances according to the limits set forth by the allowance generation algorithm 206.

Once the user has agreed to the terms and conditions, as well as to the line of credit and corresponding set of allowances, the payment instrument application system 104 may issue the secured payment instrument to the user. Further, the user's agreement to the terms and conditions, the line of credit, and the corresponding set of allowances may be used as feedback by the allowance generation algorithm 206 to update the dataset used to determine lines of credit and corresponding allowances. For instance, if the user adjusted any of the allowances defined by the allowance generation algorithm 206, the allowance generation algorithm 206 may use these adjustments to improve the accuracy of the allowance generation algorithm in generating allowances for similarly situated users applying for new lines of credit. Alternatively, if the user has agreed to the set of allowances without making any adjustments to this set of allowances, the allowance generation algorithm 206 may use the user's agreement to the original set of allowances as an indication (e.g., reinforcement) that the allowance generation algorithm 206 is accurately defining allowances for similarly situated users.

As noted above, the allowance allocation system 106 may also monitor accounts associated with issued secured payment instruments in real-time as transactions using these secured payment instruments occur in order to determine whether to update or otherwise adjust the sets of allowances allocated to these secured payment instruments. Further, the allowance allocation system 106 may monitor these accounts to determine whether to update the lines of credit associated with these secured payment instruments. For each user to which a secured payment instrument was issued, the allowance generation algorithm 206 may track the credit performance of the user and of the other users in order to update the dataset used by the allowance generation algorithm 206 to dynamically determine whether to adjust the line of credit and/or the set of allowances associated with the secured payment instrument. This dataset may be updated based on the ongoing and real-time performance of users with regard to their secured payment instruments and according to the sets of allowances established for these secured payment instruments. For example, as users utilize their secured payment instruments for different transactions, make payments towards existing balances associated with these secured payment instruments, and/or as changes are otherwise made to these users' credit histories, the dataset may be updated in real-time accordingly.

In an embodiment, if the allowance generation algorithm 206 determines that a user's line of credit may be increased as a result of the user's improvement in their credit scores and/or their continued positive maintenance of their account, the allowance generation algorithm 206 can determine whether to maintain the original set of allowances while allowing the user to use the remaining amount of the increased line of credit for any transactions desired by the user. Alternatively, the allowance generation algorithm 206 may determine whether to re-allocate the set of allowances according to any newly identified trends in the user's updated spending data and trends derived from spending data for similarly situated users. For example, the allowance generation algorithm 206 may evaluate the user's spending data corresponding to use of the secured payment instrument and of any accounts maintained by the one or more financial institutions 116 to determine whether the user's historical spending has shifted along one or more spending categories. Based on these shifts, the allowance generation algorithm may dynamically adjust the set of allowances associated with the secured payment instrument in accordance with these shifts. In some instances, if the allowance generation algorithm 206 determines that a user's line of credit may be increased as a result of the user's improvement in their credit scores and/or their continued positive maintenance of their account, the allowance generation algorithm 206 can automatically adjust the set of allowances in proportion to the increase to the line of credit associated with the secured payment instrument.

The allowance generation algorithm 206, in an embodiment, is implemented and configured to simultaneously process, in real-time, multiple requests from the user information processing sub-system 202 to provide tailored lines of credit and corresponding sets of allowances for different secured payment instruments that may be offered to users.

Accordingly, the allowance generation algorithm 206 may be configured to simultaneously process, in real-time, credit inquiry results for various users and these users' spending data in order to provide the tailored lines of credit and corresponding sets of allowances for different secured payment instruments that may be offered to these users. This may allow the allowance allocation system 106 to process numerous applications or other requests at the same time without creating a backlog that may hinder the user experience. Further, the machine learning sub-system 204 can dynamically, and in real-time, update the dataset used to train the allowance generation algorithm 206 as updated spending data is obtained and corresponding sets of allowances and lines of credit are updated based on this spending data. This may allow for the continuous and dynamic training of the allowance generation algorithm 206 in real-time, thereby improving the accuracy of the allowance generation algorithm 206 in determining lines of credit, determining sets of allowances for these lines of credit, and in dynamically updating these lines of credit and/or sets of allowances as updated spending data is received.

In an embodiment, the allowance generation algorithm is further configured to automatically provide the allowance data described above to the graduation system 108. This allowance data may be provided in real-time and may include the user's spending data as transactions occur using the secured payment instrument and any accounts associated with the one or more financial institutions 116. Further, the allowance data may include any changes to the set of allowances and/or credit limit associated with the secured payment instrument. In some instances, the allowance data may further include any credit reporting information associated with the user, including the user's present credit scores and any changes to these credit scores over time. As described in further detail herein, the graduation system 108 may use this allowance data to monitor, in real-time, the user's usage of the issued secured payment instrument to determine whether to communicate an offer of graduation to the user.

Figure 3:
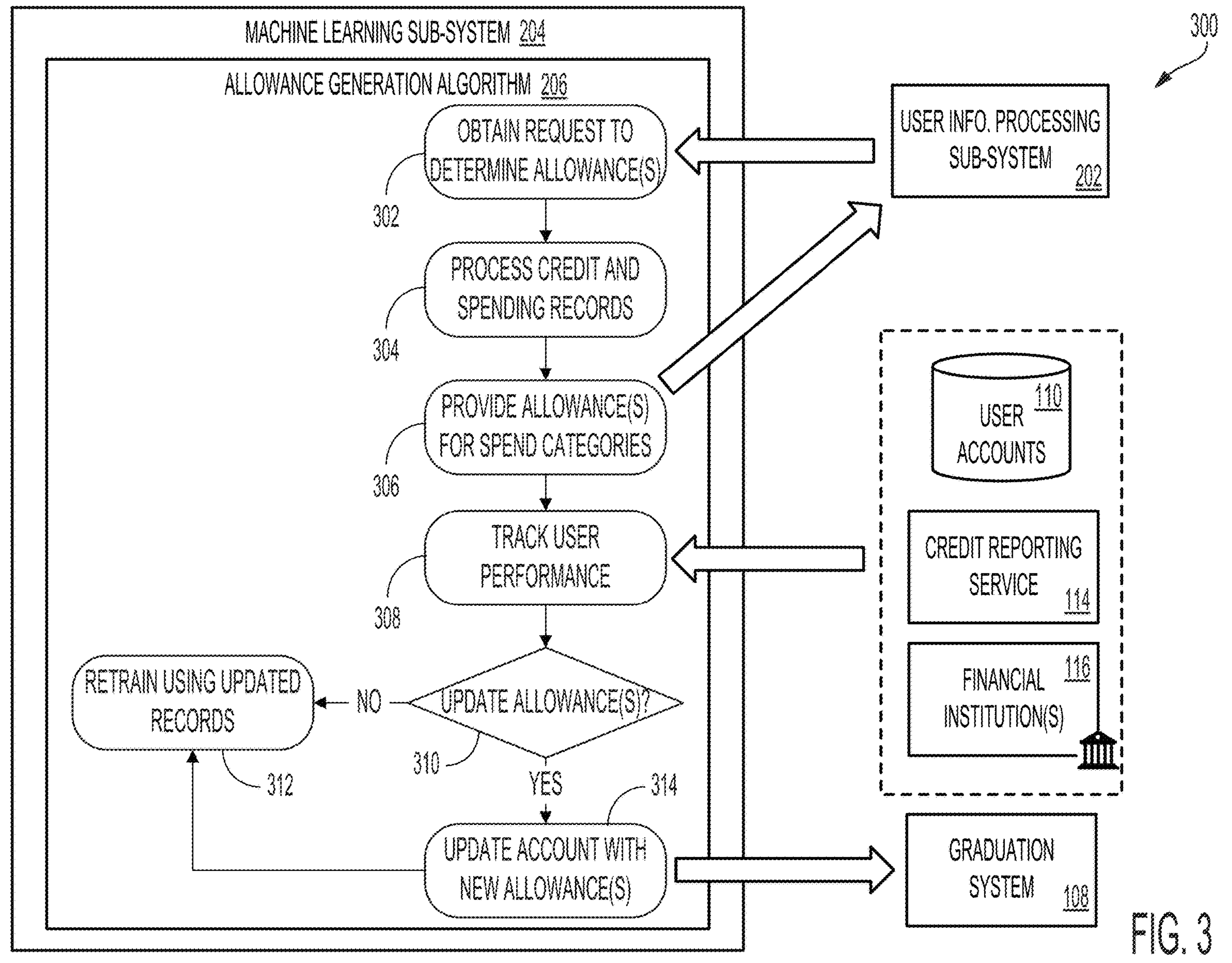
FIG. 3 shows an illustrative example of an environment in which an allowance generation algorithm processes results from a credit inquiry, spending information, and historical data corresponding to secured payment instruments issued to other users to identify a set of allowances in accordance with at least one embodiment.

FIG. 3 shows an illustrative example of an environment 300 in which an allowance generation algorithm 206 processes results from a credit inquiry, spending data, and historical data corresponding to secured payment instruments issued to other users to identify a set of allowances in accordance with at least one embodiment. As noted above, a user information processing sub-system 202 may transmit a request to the machine learning sub-system 204 to determine an amount for a new line of credit that may be offered to the user, as well as a set of allowances corresponding to different spending categories. The machine learning sub-system 204 may implement an allowance generation algorithm 206 that is dynamically trained to automatically determine an amount for a new line of credit associated with a secured payment instrument. Further, the allowance generation algorithm 206 may be dynamically trained to automatically generate a set of allowances corresponding to different spending categories. In some instances, the allowance generation algorithm 206 is further configured to dynamically adjust the set of allowances in real-time as updated spending data for the user is obtained (e.g., as the user utilizes the secured payment instrument and any other accounts associated with the one or more financial institutions 116 for various transactions).

At step 302, the allowance generation algorithm 206 may obtain a request to determine an amount for a new line of credit that may be offered to the user and a set of allowances corresponding to different spending categories. The request transmitted by the user information processing sub-system 202 to the machine learning sub-system 204 may include the spending data obtained by the user information processing sub-system 202 from the one or more financial institutions 116 that maintain user accounts (e.g., savings accounts, checking accounts, brokerage accounts, etc.) associated with a user. Further, the request may include credit reporting information associated with the user. This credit reporting information may include, for instance, one or more credit scores associated with the user, the current amount of credit allocated to the user from different financial entities (including the payment instrument service, if any), the current amount of credit available to the user, the user's credit repayment history, any known delinquencies, and the like.

At step 304, the allowance generation algorithm 206 may process the credit and spending records provided by the user information processing sub-system 202 and of other users associated with the payment instrument service. For instance, the machine learning sub-system 204 may use the result of the credit inquiry, the spending data from the one or more financial institutions 116 and/or from the user's existing accounts associated with the payment instrument service, and historical data corresponding to the user and other users associated with the payment instrument service as input to the allowance generation algorithm 206 to determine the amount of the new line of credit and to generate a set of allowances that may be used to secure the new line of credit.

As noted above, the allowance generation algorithm 206 may use the result of the credit inquiry associated with the user and the user's spending data to automatically identify a cluster of similarly situated users according to one or more vectors of similarity corresponding to features of the credit inquiry result and the spending data. From this cluster of similarly situated users, the allowance generation algorithm 206 can identify a dataset that indicates characteristics of the lines of credit issued to these similarly situated users, as well as the allowance allocations for these lines of credit. Using this dataset, the allowance generation algorithm 206 may determine the amount of the new line of credit, as well as a corresponding set of allowances that may be used to secure the new line of credit. In addition to determining the amount of the line of credit and the corresponding set of allowances, the allowance generation algorithm 206 may further determine whether to provide the user with an option to adjust the set of allowances, as described above.

At step 306, the allowance generation algorithm 206 may provide the set of allowances according to the different spending categories, as well as the amount of the new line of credit, and the option to adjust the set of allowances (if the user is approved for the option) to the user information processing sub-system 202. As noted above, the user information processing sub-system 202 may provide this data and the option (if available) to the user through the payment instrument application system 104 described above in connection with FIGS. 1 and 2. Once the user has agreed to any terms and conditions corresponding to use and maintenance of the secured payment instrument, as well as to the line of credit and corresponding set of allowances, the payment instrument application system 104 may issue the secured payment instrument to the user. Further, the user's responses to the payment instrument application system 104 (e.g., acceptance of the terms and conditions, new line of credit, and the set of allowances, etc.), may be used to update the dataset used to determine lines of credit and corresponding allowances for users applying for secured payment instruments.

At step 308, the allowance generation algorithm 206 may continuously, and in real-time, track user performance. For example, the allowance generation algorithm 206 may monitor accounts associated with issued secured payment instruments in real-time as transactions using these secured payment instruments occur. In an embodiment, transactions associated with issued secured payment instruments may be stored in the user accounts datastore 110 and associated with corresponding user accounts. The allowance generation algorithm 206 may continuously, and in real-time, stream transaction data from the user accounts datastore 110 to obtain these transactions. In an embodiment, the allowance generation algorithm 206 further obtains, in real-time, credit reporting data from the credit reporting service 114 to track the credit performance of the user and of the other users in order to update the dataset used by the allowance generation algorithm 206. Additionally, the allowance generation algorithm 206 may continue to obtain, from the one or more financial institutions 116, updated spending data corresponding to other accounts associated with these users. Thus, the dataset utilized by the allowance generation algorithm 206 may be updated based on the ongoing and real-time performance of users with regard to their secured payment instruments and their credit.

At step 310, based on this updated dataset, the allowance generation algorithm 206 may determine whether to update the set of allowances for the user and/or the line of credit associated with the secured payment instrument. For instance, if the allowance generation algorithm 206 determines the user's credit scores have improved over time by a marked amount and/or the user has continued positive maintenance of the account associated with the secured payment instrument, the allowance generation algorithm 206 may determine that the user's line of credit associated with the secured payment instrument may be increased. Alternatively, if the allowance generation algorithm 206 determines that there has not been a marked improvement to the user's credit scores over time or that the user has not continued positive maintenance of the account associated with the secured payment instrument, the allowance generation algorithm 206 may determine that the line of credit and the corresponding set of allowances do not need to be updated.

If the allowance generation algorithm 206 determines that the line of credit and the set of allowances may be updated, the allowance generation algorithm 206, at step 314, may update the account associated with the secured payment instrument with the updated line of credit and set of allowances. For instance, if the allowance generation algorithm 206 determines that a user's line of credit may be increased, the allowance generation algorithm 206 may determine whether to maintain the original set of allowances while allowing the user to use the remaining amount of the increased line of credit for any transactions desired by the user. Alternatively, the allowance generation algorithm 206 may determine whether to re-allocate the set of allowances according to any newly identified trends in the user's updated spending data and trends derived from spending data for similarly situated users. For example, the allowance generation algorithm 206 may evaluate the user's spending data corresponding to use of the secured payment instrument and of any accounts maintained by the one or more financial institutions 116 to determine whether the user's historical spending has shifted along one or more spending categories. Based on these shifts, the allowance generation algorithm may dynamically adjust the set of allowances associated with the secured payment instrument in accordance with these shifts. In some instances, if the allowance generation algorithm 206 determines that a user's line of credit may be increased, the allowance generation algorithm 206 can automatically adjust the set of allowances in proportion to the increase to the line of credit associated with the secured payment instrument.

In an embodiment, regardless of whether the allowance generation algorithm 206 determines that the line of credit and the set of allowances may be updated or not, the allowance generation algorithm 206 may be retrained using the updated records at step 312. As noted above, the machine learning sub-system 204 can dynamically, and in real-time, update the dataset used to train the allowance generation algorithm 206 as updated spending data is obtained and corresponding sets of allowances and lines of credit are updated based on this spending data. This may allow for the continuous and dynamic training of the allowance generation algorithm 206 in real-time, thereby improving the accuracy of the allowance generation algorithm 206 in determining lines of credit, determining sets of allowances for these lines of credit, and in dynamically updating these lines of credit and/or sets of allowances as updated spending data is received.

Figure 4:
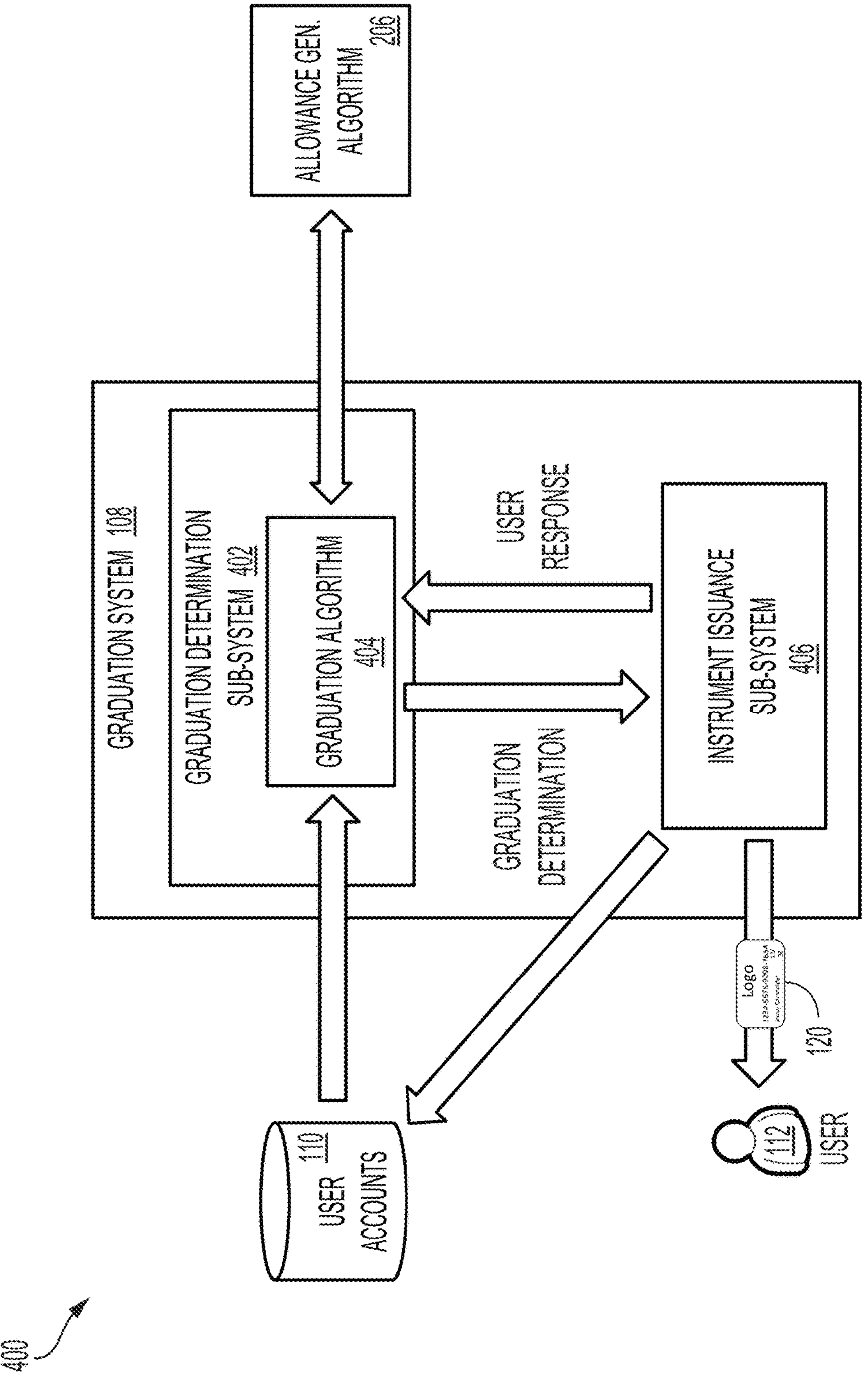
FIG. 4 shows an illustrative example of an environment in which a graduation system processes updated user account and allowance data to determine whether to graduate a secured payment instrument to an unsecured payment instrument in accordance with at least one embodiment.

FIG. 4 shows an illustrative example of an environment 400 in which a graduation system 108 processes updated user account and allowance data to determine whether to graduate a secured payment instrument to an unsecured payment instrument 120 in accordance with at least one embodiment. In the environment 400, the allowance generation algorithm 206 may provide updated allowance data corresponding to a secured payment instrument to a graduation algorithm 404 implemented by a machine learning sub-system 402 of the graduation system 108. The updated allowance data may include a corresponding user's spending data as transactions occur using the secured payment instrument and any other accounts associated with one or more financial institutions. Further, the updated allowance data may include any changes to the set of allowances and/or credit limit associated with the secured payment instrument. In some instances, the allowance data may further include any credit reporting information associated with the user, including the user's present credit scores and any changes to these credit scores over time. In an embodiment, the updated allowance data is provided by the allowance generation algorithm 206 in real-time as updated spending data is obtained for the user and as any adjustments are made to users' lines of credit and corresponding allowances based on this updated spending data.

The machine learning sub-system 402 may be implemented using a computer system of the graduation system 108. In some instances, the machine learning sub-system 402 may be implemented as an application or executable process that is executed on a computer system of the graduation system 108. In an embodiment, the machine learning sub-system 402 implements a graduation algorithm 404 that is configured to automatically, and in real-time, determine whether the secured payment instrument may be graduated to an unsecured payment instrument 120. For instance, the graduation algorithm 404 may be configured to monitor, in real-time, a user's usage of their secured payment instrument and determine whether to communicate an offer of graduation to the user. The graduation algorithm 404, in an embodiment, is a machine learning algorithm or artificial intelligence that is dynamically trained to determine whether a secured payment instrument should be graduated to an unsecured payment instrument and/or to trigger the processing of the graduation of the secured payment instrument to an unsecured payment instrument. For instance, the graduation algorithm 404 may be implemented using a clustering algorithm that is trained to identify similar accounts, similar users, and/or secured payment instruments based on one or more vectors (e.g., spending habits, credit limits, payment performance, demographic information, credit scores, changes in credit scores, sets of allowances, changes to sets of allowances, etc.). These similar accounts and/or users may correspond to different secured payment instruments issued to these users, as well as to graduation decisions based on corresponding allowance data based on the one or more vectors of similarity.

In some instances, a dataset of characteristics of accounts, account holders, and/or secured payment instruments may be analyzed using a clustering algorithm to determine whether the secured payment instrument should be graduated to an unsecured payment instrument 120 and/or to trigger the processing of the graduation of the secured payment instrument to an unsecured payment instrument 120. The dataset of characteristics of accounts and users may, in an embodiment, include historical data corresponding to the spending data associated with these users, changes to the credit scores or other credit performance metrics over time for these users, prior graduation determinations made for secured payment instruments associated with these users, and user responses to offers to graduate these users' secured payment instruments to unsecured payment instruments. Thus, the graduation algorithm 404 may be trained using sample datasets of characteristics of accounts, users, and/or secured payment instruments to classify accounts, customers, and/or secured payment instruments in order to determine whether a secured payment instrument may be graduated to an unsecured payment instrument 120 based on the obtained allowance data. These sample datasets may be generated based on information stored in the user accounts datastore 110.

In an embodiment, the machine learning sub-system 402 uses the allowance data from the allowance generation algorithm 206 and historical data corresponding to the user and other users associated with the payment instrument service as input to the graduation algorithm 404 to determine whether an offer to graduate the user's secured payment instrument to an unsecured payment instrument 120 may be communicated to the user. For instance, the graduation algorithm 404 may use the allowance data associated with the secured payment instrument issued to the user to automatically identify a cluster of similarly situated users according to one or more vectors of similarity corresponding to features of the allowance data (e.g., credit scores, changes in credit scores, spending habits, changes to spending habits, changes to allowances, total amount of credit allocated, total amount of credit available, payment performance, demographic information, etc.). From this cluster of similarly situated users, the graduation algorithm 404 may identify a dataset that indicates graduation determinations generated for these similarly situated users. Based on this dataset, the graduation algorithm 404 may determine, for the user, whether an offer to graduate their secured payment instrument to an unsecured payment instrument 120 may be communicated to the user.

If the output of the graduation algorithm 404 indicates that an offer to graduate their secured payment instrument to an unsecured payment instrument 120 may be communicated to the user, the graduation algorithm 404 may transmit this graduation determination to an instrument issuance sub-system 406 of the graduation system 108. The instrument issuance sub-system 406 may be implemented using a computer system of the graduation system 108. In some instances, the instrument issuance sub-system 406 may be implemented as an application or executable process that is executed on a computer system of the graduation system 108. The instrument issuance sub-system 406 may prompt the user 112 to provide a response as to whether the user 112 wishes to have their secured payment instrument graduated to an unsecured payment instrument 120. As noted above, the offer for graduation may include information such as the terms for the graduation, an interest rate of the unsecured payment instrument 120, a credit limit of the unsecured payment instrument 120, when the graduation will be effective, whether the graduation is automatically accepted or automatically rejected based on no response by a certain date, and other such information.

If the user 112 accepts the offer to graduate their secured payment instrument to an unsecured payment instrument 120, the instrument issuance sub-system 406 may complete graduation of the secured payment instrument to the unsecured payment instrument 120. For instance, the instrument issuance sub-system 406 may access the user accounts datastore 110 to update the user account associated with the secured payment instrument to remove the set of allowances associated with the secured payment instrument and transfer any existing balances to the line of credit associated with the unsecured payment instrument 120. Further, the instrument issuance sub-system 406 may issue the unsecured payment instrument 120 to the user 112. For instance, the instrument issuance sub-system 406 may provide a new unsecured payment instrument 120 (a physical payment instrument, a virtual payment instrument, etc.) to the user 112 to replace the previously issued secured payment instrument. In some instances, the instrument issuance sub-system 406 may automatically convert the secured payment instrument to an unsecured payment instrument 120.

As noted above, the user's response to the offer to graduate the secured payment instrument to an unsecured payment instrument 120 may be used to update, or otherwise retrain, the graduation algorithm 404. For instance, if the user 112 accepts the offer presented by the instrument issuance sub-system 406 to graduate their secured payment instrument to an unsecured payment instrument 120, the instrument issuance sub-system 406 may use this acceptance as an indication that the graduation algorithm 404 has made an accurate determination as to the eligibility for graduation and to the likelihood of the user 112 accepting the offer. Alternatively, if the user 112 rejects the offer to graduate the secured payment instrument to an unsecured payment instrument 120, the instrument issuance sub-system 406 may use this rejection as an indication that the graduation algorithm 404 has made an inaccurate determination as to the eligibility for graduation and to the likelihood of the user 112 accepting the offer. Thus, a response to the offer for graduation that either accepts or rejects the offer for graduation may be used to update aspects of the graduation algorithm 404. Similarly, other aspects of the response to the offer for graduation (e.g., the amount of time, comments made by the user 112, any other feedback, etc.) may be used to update aspects of the graduation algorithm 404.

In some instances, the graduation algorithm 404 can continuously, and in real-time, monitor the user account associated with the unsecured payment instrument 120 in order to obtain data that may be used by the allowance generation algorithm 206 to determine amounts for lines of credit associated with secured payment instruments and to determine corresponding allowances for these lines of credit. For example, as users utilize their unsecured payment instruments for different transactions, the graduation algorithm 404 may provide this spending data, in real-time, to the allowance generation algorithm 206. The allowance generation algorithm 206 may use this spending data to determine, in real-time, the spending habits of these users according to the different spending categories defined by the allowance allocation system. Thus, the historical data used by the allowance generation algorithm 206 may be continuously updated in real-time to incorporate the spending habits of these users, as determined using the spending data obtained by the graduation algorithm 404.

Figure 5:
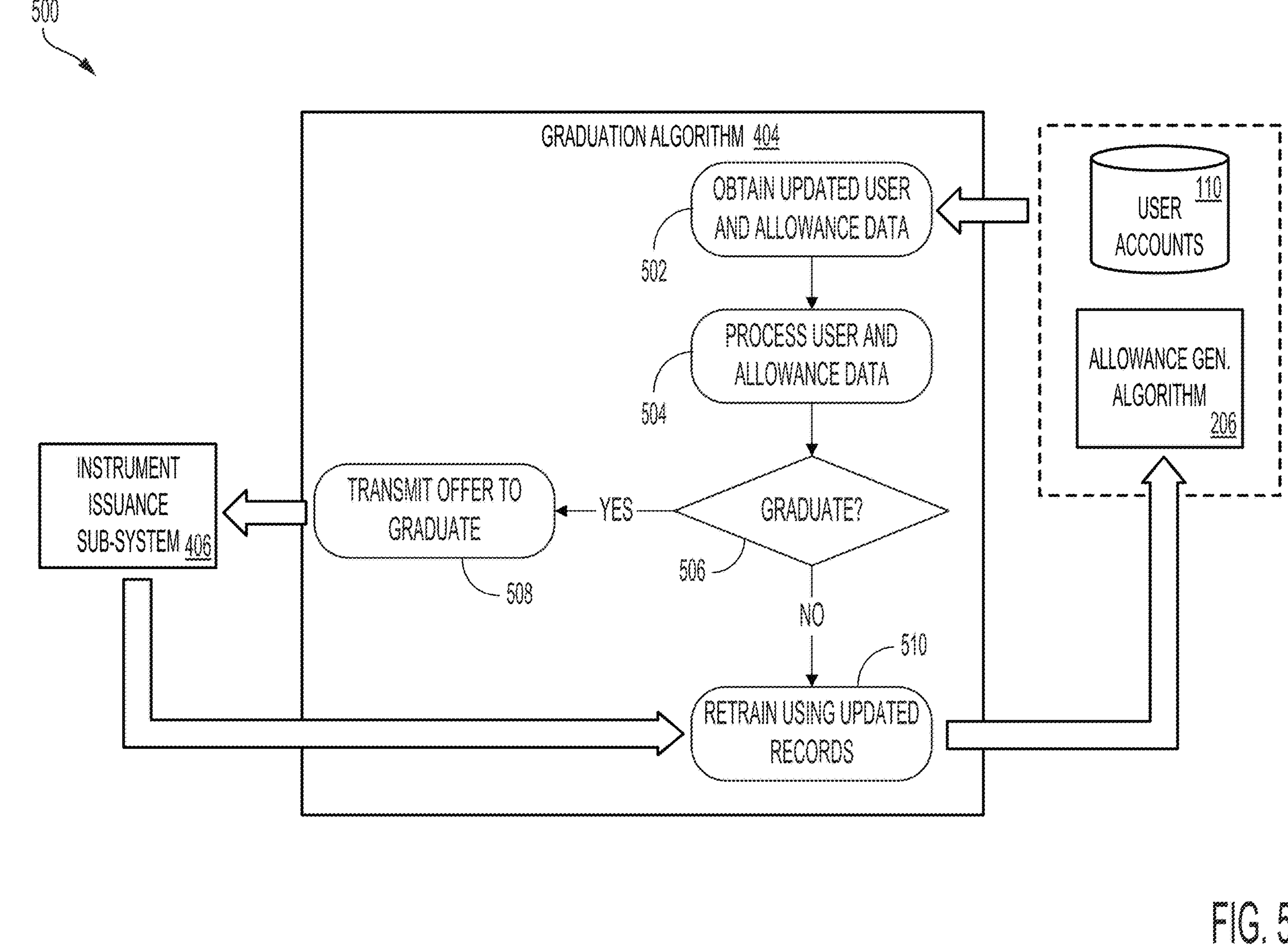
FIG. 5 shows an illustrative example of an environment in which a graduation algorithm processes updated user account and allowance data to automatically determine whether to graduate a secured payment instrument to an unsecured payment instrument in accordance with at least one embodiment.

FIG. 5 shows an illustrative example of an environment 500 in which a graduation algorithm 404 processes updated user account and allowance data to automatically determine whether to graduate a secured payment instrument to an unsecured payment instrument in accordance with at least one embodiment. As noted above, an allowance generation algorithm 206 may transmit updated allowance data corresponding to a secured payment instrument to the graduation algorithm 404 to determine whether the secured payment instrument may be graduated to an unsecured payment instrument. The graduation algorithm 404 may be dynamically trained to automatically, and in real-time, determine whether a secured payment instrument should be graduated to an unsecured payment instrument and/or to trigger the processing of the graduation of the secured payment instrument to an unsecured payment instrument.

At step 502, the graduation algorithm 404 may obtain user and allowance data associated with a particular secured payment instrument. The user and allowance data may include a user's spending data as transactions occur using the secured payment instrument and any other accounts associated with one or more financial institutions. Further, the user and allowance data may include any changes to the set of allowances and/or credit limit associated with the secured payment instrument. In some instances, the user and allowance data may further include any credit reporting information associated with the user, including the user's present credit scores and any changes to these credit scores over time. The user and allowance data may be provided by the allowance generation algorithm 206 in real-time as updated spending data is obtained for the user and as any adjustments are made to users' lines of credit and corresponding allowances based on this updated spending data.

At step 504, the graduation algorithm 404 may process the user and allowance data. For instance, the graduation algorithm 404 may use the user and allowance data associated with the secured payment instrument issued to the user to automatically identify a cluster of similarly situated users according to one or more vectors of similarity corresponding to features of the allowance data (e.g., credit scores, changes in credit scores, spending habits, changes to spending habits, changes to allowances, total amount of credit allocated, total amount of credit available, payment performance, demographic information, etc.). From this cluster of similarly situated users, the graduation algorithm 404 may identify a dataset that indicates graduation determinations generated for these similarly situated users. From this dataset, the graduation algorithm 404 may determine, at step 506, whether an offer to graduate the secured payment instrument to an unsecured payment instrument may be communicated to the user.

If the graduation algorithm 404 determines, based on the identified dataset, that an offer to graduate a secured payment instrument to an unsecured payment instrument may be communicated to the user, the graduation algorithm 404, at step 508, may transmit the offer to the user through the instrument issuance sub-system 406. The user may be prompted to provide a response as to whether the user wishes to have their secured payment instrument graduated to an unsecured payment instrument. The offer for graduation may include information such as the terms for the graduation, an interest rate of the unsecured payment instrument, a credit limit of the unsecured payment instrument, when the graduation will be effective, whether the graduation is automatically accepted or automatically rejected based on no response by a certain date, and other such information. As noted above, if the user accepts the offer to graduate their secured payment instrument to an unsecured payment instrument, the instrument issuance sub-system 406 may complete graduation of the secured payment instrument to the unsecured payment instrument.

The instrument issuance sub-system 406 may use the response from the user with regard to the offer to graduate their secured payment instrument to, at step 510, retrain the graduation algorithm 404. For example, if the user accepts the offer to graduate their secured payment instrument to an unsecured payment instrument, the instrument issuance sub-system 406 may use this acceptance as an indication that the graduation algorithm 404 has made an accurate determination as to the eligibility for graduation and to the likelihood of the user accepting the offer. Alternatively, if the user rejects the offer, the instrument issuance sub-system 406 may use this rejection as an indication that the graduation algorithm 404 has made an inaccurate determination as to the eligibility for graduation and to the likelihood of the user accepting the offer. Thus, a response to the offer for graduation that either accepts or rejects the offer for graduation may be used to retrain the graduation algorithm 404.

As noted above, the graduation algorithm 404 may continuously, and in real-time, monitor the user accounts datastore 110 to obtain updated spending data for secured and unsecured payment instruments that may be used by the allowance generation algorithm 206 to determine amounts for lines of credit associated with secured payment instruments and to determine corresponding allowances for these lines of credit. For example, as users utilize their unsecured payment instruments for different transactions, the graduation algorithm 404 may provide this spending data, in real-time, to the allowance generation algorithm 206. The allowance generation algorithm 206 may use this spending data to determine, in real-time, the spending habits of these users according to the different spending categories defined by the allowance allocation system. These spending habits may be used to update the historical data that is used by the allowance generation algorithm 206 to dynamically determine lines of credit and corresponding allowances for secured payment instruments.

Figure 6:
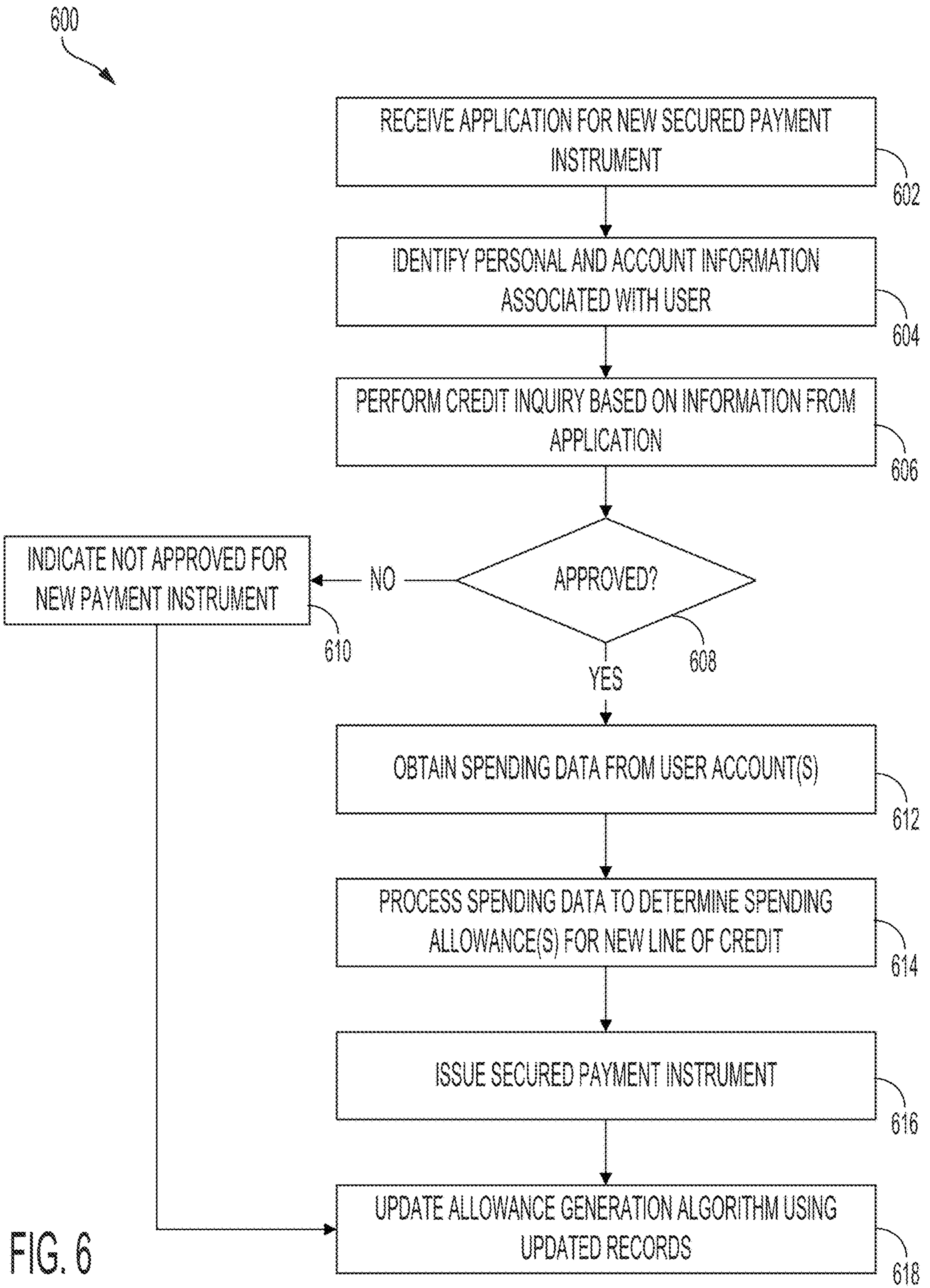
FIG. 6 shows an illustrative example of a process for determining a set of allowances to be allocated in order to secure a line of credit associated with a secured payment instrument in accordance with at least one embodiment.

FIG. 6 shows an illustrative example of a process 600 for determining a set of allowances to be allocated in order to secure a line of credit associated with a secured payment instrument in accordance with at least one embodiment. The process 600 may be performed by an allowance allocation system associated with a payment instrument service. As noted above, the allowance allocation system is implemented to process incoming applications or other requests for secured payment instruments, obtain spending data and credit inquiry results associated with users applying for these secured payment instruments, and based on this spending data and credit inquiry results, determine amounts of lines of credit and corresponding allowances that may be used to secure these lines of credit.

At step 602, the allowance allocation system may receive an application for a new secured payment instrument. As noted above, a payment instrument application system of the payment instrument service may provide an application or other request for a new line of credit associated with a secured payment instrument. The application or other request may include user information associated with the user that is applying for the new line of credit. In some instances, the user information may include information corresponding to one or more accounts associated with one or more financial institutions (e.g., savings accounts, checking accounts, investment accounts, brokerage accounts, etc.), such as account credentials that may be used to access these one or more accounts. The user information may also include personal information about the user that may be used to perform a credit inquiry of the user's credit history to determine whether the user is qualified for a new line of credit associated with a secured payment instrument and, if so, to determine the amount of the new line of credit. Thus, at step 604, the allowance allocation system may identify this personal and account information associated with the user from the application.

At step 606, the allowance allocation system may perform a credit inquiry based on the information provided in the application. For instance, the allowance allocation system may submit a request to a credit reporting service to perform a credit inquiry of the user's credit report. The credit reporting service, in response to the credit inquiry, may provide data that may be used to determine the user's credit performance over time. This data, for instance, may include one or more credit scores associated with the user, the current amount of credit allocated to the user from different financial entities (including the payment instrument service, if any), the current amount of credit available to the user, the user's credit repayment history, any known delinquencies, and the like.

At step 608, the allowance allocation system may determine whether the user is approved for a new line of credit associated with a secured payment instrument. In an embodiment, the allowance allocation system implements a machine learning algorithm or artificial intelligence to determine whether the user is approved for the new line of credit. The machine learning algorithm or artificial intelligence may be implemented to automatically, and dynamically, evaluate the applications submitted by users for new lines of credit, as well as these users' credit histories as provided by the credit reporting service, to determine whether these users are approved for these new lines of credit. For instance, for the user that submitted the application, the machine learning algorithm or artificial intelligence may process the provided application, the result of the full credit inquiry, and any existing user records from the user accounts datastore (such as the user accounts datastore 110 described above in connection with FIG. 1) to determine whether the user is approved for the new line of credit. For instance, based on the user's credit history, characteristics of the user (e.g., demographic information, etc.), and information provided in the application (e.g., current income, employment status, current employment title, length of employment, etc.), the machine learning algorithm or artificial intelligence may identify similarly situated users according to one or more vectors of similarity (e.g., credit scores, changes in credit scores, spending habits, total amount of credit allocated, total amount of credit available, payment performance, demographic information, etc.). These similarly situated users may correspond to secured payment instruments issued to these account holders and/or to applications that have been rejected based on the one or more vectors of similarity. The machine learning algorithm or artificial intelligence, in some instances, may analyze a dataset of characteristics of users and accounts to determine whether to approve or reject the submitted application. This dataset may include historical data corresponding to the applications for new lines of credit submitted by different users, the decisions made in response to these applications (e.g., approve or deny), the users' performance in maintaining the lines of credit associated with these payment instruments in good standing, historical changes to the users' credit scores while maintaining these lines of credit, and the like.

At step 610, if the allowance allocation system determines that the user is not approved for a new line of credit associated with a secured payment instrument, the allowance allocation system may indicate that the user has not been approved for the applied for secured payment instrument. For instance, the allowance allocation system may transmit a notification, through the payment instrument application system, to the user to indicate that the user has not been approved for the new line of credit. In some instances, the allowance allocation system may further provide the user with a rationale for the rejection of their application for the new line of credit. For example, if the user was rejected due to a poor credit score and a history of payment delinquencies, the allowance allocation system may generate a response that indicates that the poor credit score and the user's past history were contributing factors to the application being rejected. In some instances, any rationale provided may omit any specific metrics leading to rejection of the application. For example, the allowance allocation system may omit actual credit score values, descriptions of individual events corresponding to negative contributing factors towards rejection, and the like.

At step 612, if the allowance allocation system determines that the user is approved for a new line of credit associated with a secured payment instrument, the allowance allocation system may obtain spending data from the financial institutions that maintain the user's other accounts. The allowance allocation system may automatically access an account associated with the user and maintained by a financial institution by using a corresponding set of credentials provided by the user through their application or other request, or as identified from a user account associated with the payment instrument service. In some examples, to automatically access an account maintained by a financial institution, the allowance allocation system may transmit an API call to a computer system of the financial institution. From an account associated with a user and maintained by a financial institution, the allowance allocation system may automatically obtain user account statements or other information that may be used to obtain spending data for the user over a pre-defined period of time. As noted above, these user account statements or other information may specify the various transactions and corresponding amounts withdrawn from the user's account over time. Further, the user account statements or other information may categorize these transactions and corresponding amounts according to different spending categories, such as housing expenses, expenses related to food and other necessities, medical expenses, entertainment or discretionary expenses, childcare expenses, and the like. This categorization of transactions may be performed automatically by a financial institution or by the allowance allocation system, as described above.

At step 612, the allowance allocation system may process the spending data to determine the spending allowances for the new line of credit. As noted above, the allowance allocation system may implement an allowance generation algorithm that is configured to automatically, and dynamically, generate a set of allowances corresponding to different spending categories for a new line of credit. The allowance generation algorithm may be implemented using a clustering algorithm that is trained to identify similar accounts and/or users based on one or more vectors of similarity (e.g., credit scores, changes in credit scores, spending habits, spending trends across different spending categories, total amount of credit allocated, total amount of credit available, payment performance, demographic information, etc.). These similar accounts and/or users may correspond to different secured payment instruments issued to these users, as well as to the allowances allocated to these secured payment instruments based on the one or more vectors of similarity. The allowance generation algorithm may be trained using sample datasets of characteristics of accounts, users, and/or secured payment instruments to classify accounts, customers, and/or secured payment instruments in order to determine sets of allowances to secure new lines of credit based on the results of the users' credit inquiries and spending data. These sample datasets may be generated based on information stored in the user accounts datastore.

The allowance generation algorithm implemented by the allowance allocation system may use the result of the credit inquiry associated with the user and the user's spending data to automatically identify a cluster of similarly situated users according to one or more vectors of similarity corresponding to features of the credit inquiry result and the spending data. From this cluster of similarly situated users, the allowance generation algorithm can identify a dataset that indicates characteristics of the lines of credit issued to these similarly situated users, as well as the allowance allocations for these lines of credit. The dataset may further indicate these users' management of the payment instruments issued to these users, changes made to the allowances allocated to these payment instruments over time, changes made to these users' spending data over time, and offers provided to these users to graduate their payment instruments. Based on this dataset, the allowance generation algorithm may determine, for the user, the set of allowances that may be used to secure the new line of credit. It should be noted that the amount of the new line of credit and the corresponding set of allowances may be determined simultaneously using the allowance generation algorithm. Thus, steps 606-610 may be performed by the allowance generation algorithm in conjunction with step 614 after obtaining the spending data from the user's accounts.

At step 616, the allowance allocation system, through the payment instrument application system, may issue the secured payment instrument to the user. The allowance allocation system may provide allowance data corresponding to the new line of credit to the user. As noted above, the allowance data may indicate the amount of the new line of credit, the set of allowances defined to secure the new line of credit, and any options to adjust the set of allowances prior to issuance of a new secured payment instrument corresponding to the new line of credit. Once the user has agreed to the terms and conditions associated with the secured payment instrument, as well as to the new line of credit and corresponding set of allowances, the secured payment instrument may be issued to the user.

At step 618, the allowance allocation system may update, or otherwise retrain, the allowance generation algorithm using updated records, regardless of whether the application was rejected by the allowance allocation system or approved. For instance, the user's agreement to the terms and conditions, the line of credit, and the corresponding set of allowances may be used as feedback by the allowance allocation system to update the dataset used by the allowance generation algorithm to determine lines of credit and corresponding allowances. For instance, if the user adjusted any of the allowances defined by the allowance generation algorithm, the allowance allocation system may use these adjustments to improve the accuracy of the allowance generation algorithm in generating allowances for similarly situated users applying for new lines of credit. Alternatively, if the user has agreed to the set of allowances without making any adjustments to this set of allowances, the allowance allocation system may use the user's agreement to the original set of allowances as an indication (e.g., reinforcement) that the allowance generation algorithm is accurately defining allowances for similarly situated users.

It should be noted that the process 600 may include additional and/or alternative steps or operations that may serve to provide additional functionality to the allowance allocation system. For example, in an embodiment, the allowance allocation system can monitor accounts associated with issued secured payment instruments in real-time as transactions using these secured payment instruments occur in order to determine whether to update or otherwise adjust the sets of allowances allocated to these secured payment instruments. Additionally, the allowance allocation system may monitor these accounts in real-time to determine whether to update the lines of credit associated with these secured payment instruments. In some instances, the allowance allocation system may track the credit performance of each user to which a secured payment instrument was issued in order to update the dataset used by the allowance allocation algorithm to determine whether to adjust the lines of credit and/or the sets of allowances associated with the issued secured payment instruments. This dataset may be updated based on the ongoing and real-time performance of users with regard to their secured payment instruments and according to the sets of allowances established for these secured payment instruments.

Figure 7:
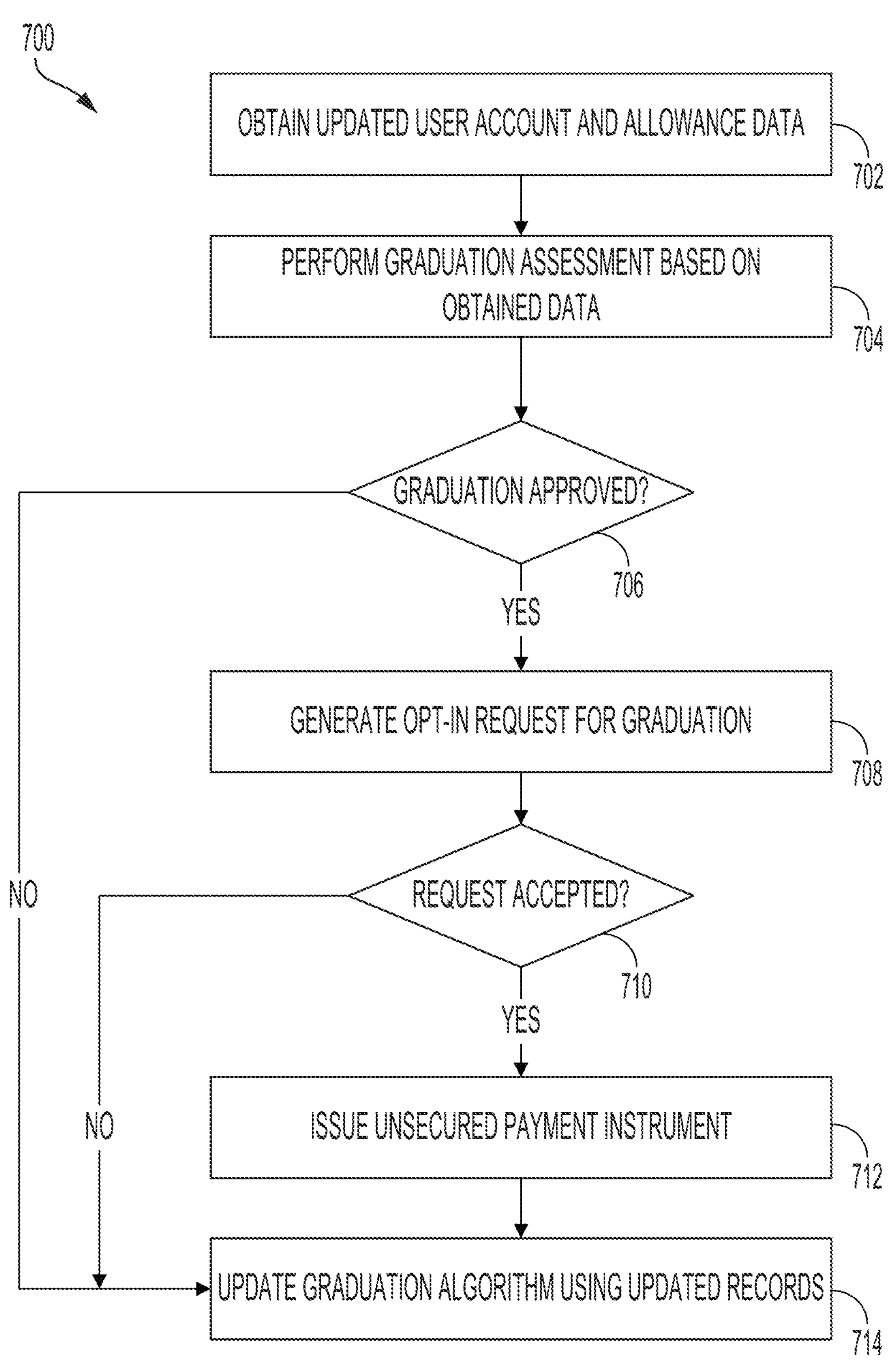
FIG. 7 shows an illustrative example of a process for determining whether to graduate an existing secured payment instrument to an unsecured payment instrument based on results of a soft credit inquiry and data corresponding to a user's account and set of allowances associated with the existing secured payment instrument in accordance with at least one embodiment.

FIG. 7 shows an illustrative example of a process 700 for determining whether to graduate an existing secured payment instrument to an unsecured payment instrument based on results of a soft credit inquiry and data corresponding to a user's account and set of allowances associated with the existing secured payment instrument in accordance with at least one embodiment. The process 700 may be performed by a graduation system associated with a payment instrument service. As noted above, the graduation system is implemented to process updated user account and allowance data to determine whether to graduate a secured payment instrument to an unsecured payment instrument.

At step 702, the graduation system may obtain updated user account and allowance data. As noted above, an allowance generation algorithm implemented by the allowance allocation system may provide updated user and allowance data corresponding to a secured payment instrument to the graduation system. This updated data may include a corresponding user's spending data as transactions occur using the secured payment instrument and any other accounts associated with one or more financial institutions. Further, the updated data may include any changes to the set of allowances and/or credit limit associated with the secured payment instrument. In some instances, the updated data may further include any credit reporting information associated with the user, including the user's present credit scores and any changes to these credit scores over time. The updated user and allowance data may be obtained in real-time as updated spending data is obtained for the user and as any adjustments are made to users' lines of credit and corresponding allowances based on this updated spending data.

At step 704, the graduation system may perform a graduation assessment based on the obtained data. As noted above, the graduation may implement a graduation algorithm that is configured to automatically, and in real-time, determine whether the secured payment instrument may be graduated to an unsecured payment instrument. For instance, the graduation algorithm may automatically process the obtained data and identify similar accounts, similar users, and/or secured payment instruments based on one or more vectors (e.g., spending habits, credit limits, payment performance, demographic information, credit scores, changes in credit scores, sets of allowances, changes to sets of allowances, etc.). These similar accounts and/or users may correspond to different secured payment instruments issued to these users, as well as to graduation decisions based on corresponding allowance data based on the one or more vectors of similarity. The graduation algorithm may be trained using sample datasets of characteristics of accounts, users, and/or secured payment instruments to classify accounts, customers, and/or secured payment instruments in order to determine whether a secured payment instrument may be graduated to an unsecured payment instrument based on the obtained allowance data.

As noted above, the graduation algorithm implemented by the graduation system may use the updated data, as well as historical data corresponding to the user and other users associated with the payment instrument service to determine whether an offer to graduate the user's secured payment instrument to an unsecured payment instrument may be communicated to the user. Using this data, the graduation algorithm may identify a cluster of similarly situated users according to one or more vectors of similarity corresponding to features of the obtained data. From this cluster of similarly situated users, the graduation algorithm may identify a dataset that indicates graduation determinations generated for these similarly situated users. Thus, using this dataset, the graduation algorithm may perform a graduation assessment for the secured payment instrument and determine, at step 706, whether graduation of the secured payment instrument may be performed.

If the graduation system, through the graduation algorithm, determines that graduation of the secured payment instrument to an unsecured payment instrument may be performed, the graduation system may generate and opt-in request for graduation at step 708. For instance, if the output of the graduation algorithm indicates that an offer to graduate the secured payment instrument to an unsecured payment instrument may be communicated to the user, the graduation system prompt the user to provide a response as to whether the user wishes to have their secured payment instrument graduated to an unsecured payment instrument. As noted above, the offer for graduation may include information such as the terms for the graduation, an interest rate of the unsecured payment instrument, a credit limit of the unsecured payment instrument, when the graduation will be effective, whether the graduation is automatically accepted or automatically rejected based on no response by a certain date, and other such information.

Based on the user's response to the aforementioned offer, the graduation system may determine, at step 710, whether the offer has been accepted. If the user accepts the offer to graduate their secured payment instrument to an unsecured payment instrument, the graduation system may complete graduation of the secured payment instrument to the unsecured payment instrument. For instance, the graduation system may update the user's account associated with the secured payment instrument to remove the set of allowances associated with the secured payment instrument and transfer any existing balances to the line of credit associated with the unsecured payment instrument. Further, the graduation system, at step 712, may issue the unsecured payment instrument to the user.

At step 714, the graduation system may update the graduation algorithm based on the graduation assessment and the user's response to the graduation offer (if graduation was approved). For instance, if the user accepts the offer presented by the graduation system, the graduation system may use this acceptance as an indication that the graduation algorithm has made an accurate determination as to the eligibility for graduation and to the likelihood of the user accepting the offer. Alternatively, if the user rejects the offer, the graduation system may use this rejection as an indication that the graduation algorithm has made an inaccurate determination as to the eligibility for graduation and to the likelihood of the user accepting the offer. Thus, a response to the offer for graduation that either accepts or rejects the offer for graduation may be used to update aspects of the graduation algorithm.

Figure 8:
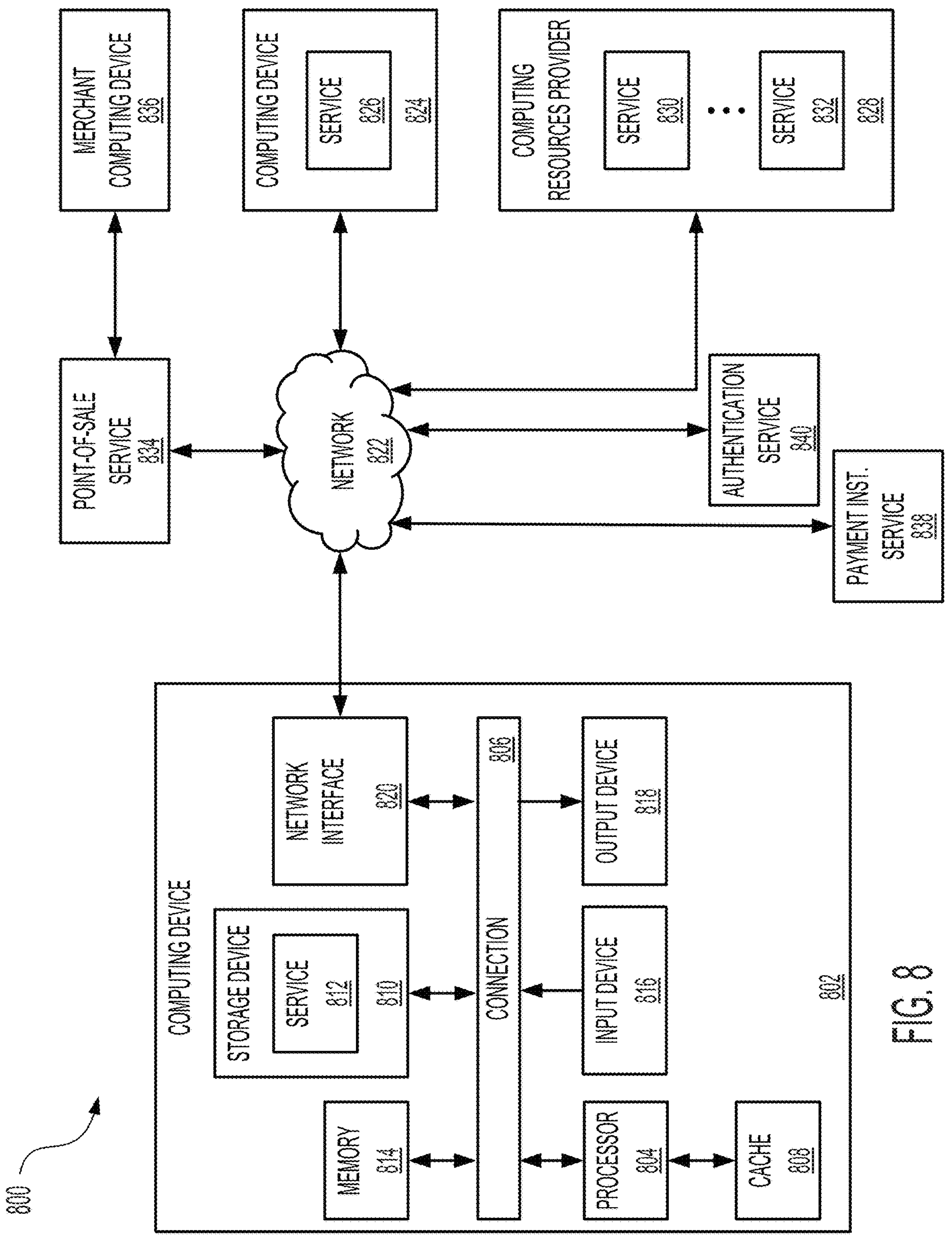
FIG. 8 shows a computing system architecture including various components in electrical communication with each other using a connection in accordance with various embodiments.

FIG. 8 illustrates a computing system architecture 800, including various components in electrical communication with each other, in accordance with some embodiments. The example computing system architecture 800 illustrated in FIG. 8 includes a computing device 802, which has various components in electrical communication with each other using a connection 806, such as a bus, in accordance with some implementations. The example computing system architecture 800 includes a processing unit 804 that is in electrical communication with various system components, using the connection 806, and including the system memory 814. In some embodiments, the system memory 814 includes read-only memory (ROM), random-access memory (RAM), and other such memory technologies including, but not limited to, those described herein. In some embodiments, the example computing system architecture 800 includes a cache 808 of high-speed memory connected directly with, in close proximity to, or integrated as part of the processor 804. The system architecture 800 can copy data from the memory 814 and/or the storage device 810 to the cache 808 for quick access by the processor 804. In this way, the cache 808 can provide a performance boost that decreases or eliminates processor delays in the processor 804 due to waiting for data. Using modules, methods and services such as those described herein, the processor 804 can be configured to perform various actions. In some embodiments, the cache 808 may include multiple types of cache including, for example, level one (L1) and level two (L2) cache. The memory 814 may be referred to herein as system memory or computer system memory. The memory 814 may include, at various times, elements of an operating system, one or more applications, data associated with the operating system or the one or more applications, or other such data associated with the computing device 802.

Other system memory 814 can be available for use as well. The memory 814 can include multiple different types of memory with different performance characteristics. The processor 804 can include any general purpose processor and one or more hardware or software services, such as service 812 stored in storage device 810, configured to control the processor 804 as well as a special-purpose processor where software instructions are incorporated into the actual processor design. The processor 804 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 804 can be a microprocessor, a microcontroller, a digital signal processor ("DSP"), or a combination of these and/or other types of processors. In some embodiments, the processor 804 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 800, an input device 816 can represent any number of input mechanisms, such as a microphone for speech, a touch-sensitive screen for gesture or graphical input, keyboard, mouse, motion input, pen, and other such input devices. An output device 818 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 800. In some embodiments, the input device 816 and/or the output device 818 can be coupled to the computing device 802 using a remote connection device such as, for example, a communication interface such as the network interface 820 described herein. In such embodiments, the communication interface can govern and manage the input and output received from the attached input device 816 and/or output device 818. As may be contemplated, there is no restriction on operating on any particular hardware arrangement and accordingly the basic features here may easily be substituted for other hardware, software, or firmware arrangements as they are developed.

In some embodiments, the storage device 810 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 810 can include hardware and/or software services such as service 812 that can control or configure the processor 804 to perform one or more functions including, but not limited to, the methods, processes, functions, systems, and services described herein in various embodiments. In some embodiments, the hardware or software services can be implemented as modules. As illustrated in example computing system architecture 800, the storage device 810 can be connected to other parts of the computing device 802 using the system connection 806. In an embodiment, a hardware service or hardware module such as service 812, that performs a function can include a software component stored in a non-transitory computer-readable medium that, in connection with the necessary hardware components, such as the processor 804, connection 806, cache 808, storage device 810, memory 814, input device 816, output device 818, and so forth, can carry out the functions such as those described herein.

The disclosed dual-feature credit card service, the systems of the dual-feature credit card service, and the systems and methods for graduating a secured dual-feature credit card to an unsecured dual-feature credit card can be performed using a computing system such as the example computing system illustrated in FIG. 8, using one or more components of the example computing system architecture 800. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems for graduating a secured dual-feature credit card to an unsecured dual-feature credit card described herein by, for example, executing code using a processor such as processor 804 wherein the code is stored in memory such as memory 814 as described herein. One or more of a user device, a provider server or system, a database system, or other such devices, services, or systems may include some or all of the components of the computing system such as the example computing system illustrated in FIG. 8, using one or more components of the example computing system architecture 800 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 828. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 804 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 814 can be coupled to the processor 804 by, for example, a connector such as connector 806, or a bus. As used herein, a connector or bus such as connector 806 is a communications system that transfers data between components within the computing device 802 and may, in some embodiments, be used to transfer data between computing devices. The connector 806 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 814 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 814 can also include magnetic or optical data storage media including read-only (e.g., CD ROM and DVD ROM) or otherwise (e.g., CD or DVD). The memory can be local, remote, or distributed.

As described herein, the connector 806 (or bus) can also couple the processor 804 to the storage device 810, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 810. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 806 can also couple the processor 804 to a network interface device such as the network interface 820. The interface can include one or more of a modem or other such network interfaces including, but not limited to those described herein. It will be appreciated that the network interface 820 may be considered to be part of the computing device 802 or may be separate from the computing device 802. The network interface 820 can include one or more of an analog modem, Integrated Services Digital Network (ISDN) modem, cable modem, token ring interface, satellite transmission interface, or other interfaces for coupling a computer system to other computer systems. In some embodiments, the network interface 820 can include one or more input and/or output (I/O) devices. The I/O devices can include, by way of example but not limitation, input devices such as input device 816 and/or output devices such as output device 818. For example, the network interface 820 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 802 can be connected to one or more additional computing devices such as computing device 824 via a network 822 using a connection such as the network interface 820. In such embodiments, the computing device 824 may execute one or more services 826 to perform one or more functions under the control of, or on behalf of, programs and/or services operating on computing device 802. In some embodiments, a computing device such as computing device 824 may include one or more of the types of components as described in connection with computing device 802 including, but not limited to, a processor such as processor 804, a connection such as connection 806, a cache such as cache 808, a storage device such as storage device 810, memory such as memory 814, an input device such as input device 816, and an output device such as output device 818. In such embodiments, the computing device 824 can carry out the functions such as those described herein in connection with computing device 802. In some embodiments, the computing device 802 can be connected to a plurality of computing devices such as computing device 824, each of which may also be connected to a plurality of computing devices such as computing device 824. Such an embodiment may be referred to herein as a distributed computing environment.

The network 822 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 822 can be wired connections, wireless connections, or combinations thereof. Communications via the network 822 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 822, within the computing device 802, within the computing device 824, or within the computing resources provider 828 can include information, which also may be referred to herein as content. The information may include text, graphics, audio, video, haptics, and/or any other information that can be provided to a user of the computing device such as the computing device 802. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 802 and presented to a user of the computing device 802 using forms that are perceptible via sight, sound, smell, taste, touch, or other such mechanisms. In some embodiments, communications over the network 822 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 802 and/or the computing device 824 can be connected to a computing resources provider 828 via the network 822 using a network interface such as those described herein (e.g. network interface 820). In such embodiments, one or more systems (e.g., service 830 and service 832) hosted within the computing resources provider 828 (also referred to herein as within "a computing resources provider environment") may execute one or more services to perform one or more functions under the control of, or on behalf of, programs and/or services operating on computing device 802 and/or computing device 824. Systems such as service 830 and service 832 may include one or more computing devices such as those described herein to execute computer code to perform the one or more functions under the control of, or on behalf of, programs and/or services operating on computing device 802 and/or computing device 824.

For example, the computing resources provider 828 may provide a service, operating on service 830 to store data for the computing device 802 when, for example, the amount of data that the computing device 802 exceeds the capacity of storage device 810. In another example, the computing resources provider 828 may provide a service to first instantiate a virtual machine (VM) on service 832, use that VM to access the data stored on service 832, perform one or more operations on that data, and provide a result of those one or more operations to the computing device 802. Such operations (e.g., data storage and VM instantiation) may be referred to herein as operating "in the cloud," "within a cloud computing environment," or "within a hosted virtual machine environment," and the computing resources provider 828 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 828 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 830 and service 832 may implement versions of various services (e.g., the service 812 or the service 826) on behalf of, or under the control of, computing device 802 and/or computing device 824. Such implemented versions of various services may involve one or more virtualization techniques so that, for example, it may appear to a user of computing device 802 that the service 812 is executing on the computing device 802 when the service is executing on, for example, service 830. As may also be contemplated, the various services operating within the computing resources provider 828 environment may be distributed among various systems within the environment as well as partially distributed onto computing device 824 and/or computing device 802.

In an embodiment, the computing device 802 can be connected to one or more additional computing devices and/or services such as merchant computing device 836 and/or a point-of-sale service 834 via the network 822 and using a connection such as the network interface 820. In an embodiment, the point-of-sale service 834 is separate from the merchant computing device 836. In an embodiment, the point-of-sale service 834 is executing on the merchant computing device 836. In an embodiment, the point-of-sale service 834 is executing as one or more services (e.g., the service 830 and/or the service 832) operating within the environment of the computing resources provider. As used herein, a point-of-sale service 834 is a service used by one or more merchants to manage sales transactions for customers, to process payment transactions for customers (e.g., credit card transactions), to manage inventory for merchants, to identify customers based on, for example, customer loyalty programs, and other such tasks.

In an embodiment, a customer and/or a merchant uses the merchant computing device 836 to interact with the point-of-sale service 834. In an embodiment, the merchant computing device 836 is a dedicated point-of-service (POS) terminal. In an embodiment, the merchant computing device 836 is a cash register system. In an embodiment, the merchant computing device 836 is an application or web service operating on a computing device such as the computing device 802 described herein. In such an embodiment, the application or web service may be provided by a financial services system (e.g., a bank, a transaction processing system, an inventory management system, or some other such financial services system). In an embodiment, the merchant computing device 836 includes an auxiliary device or system to execute tasks associated with the point-of-sale service 834 (e.g., a credit card processing device attached to a smart phone or tablet). In an embodiment, the merchant computing device 836 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor. In an embodiment, the merchant computing device 836 is a virtual device (e.g., a virtual kiosk) such as the virtual devices described herein. Although not illustrated here, in an embodiment, the merchant computing device 836 may be one of a plurality of devices that may be interconnected using a network such as the network 822.

In an embodiment, the computing device 802 can be connected to one or more additional computing devices and/or services such as a credit card service 838 via the network 822 and using a connection such as the network interface 820. In an embodiment, the credit card service 838 connects directly with the point of sale service 834. In an embodiment, elements of the credit card service 838 are executing on the merchant computing device 836. In an embodiment, the credit card service 838 is executing as one or more services (e.g., the service 830 and/or the service 832) operating within the environment of the computing resources provider. As used herein, a credit card service 838 is a service used by various entities (e.g., merchants, financial institutions, and account holders) to manage credit card transactions (e.g., sales and payments), process payment, to issue credit cards to account holders, and to perform other such actions.

In an embodiment, elements of the credit card service 838 are running as an application or web service operating on a computing device such as the computing device 802 described herein. In such an embodiment, the application or web service of the credit card service 838 may be provided by a financial services system (e.g., a bank, a transaction processing system, an inventory management system, or some other such financial services system). In an embodiment, elements of the credit card service 838 are running on an auxiliary device or system configured to execute tasks associated with the credit card service 838 (e.g., uses a credit card processing device attached to a smart phone or tablet). In an embodiment, elements of the credit card service 838 are running on virtual device such as those described herein. Although not illustrated here, in an embodiment, the credit card service 838 may be running on one or more of a plurality of devices that may be interconnected using a network such as the network 822.

In an embodiment, the computing device 802 can be connected to one or more additional computing devices and/or services such as an authentication service 840 via the network 822 and using a connection such as the network interface 820. In an embodiment, the authentication service 840 is an element of the credit card service 838. In an embodiment, the authentication service 840 is separate from the credit card service 838. In an embodiment, the authentication service 840 connects directly with the point of sale service 834. In an embodiment, elements of the authentication service 840 are executing on the merchant computing device 836. In an embodiment, the authentication service 840 is executing as one or more services (e.g., the service 830 and/or the service 832) operating within the environment of the computing resources provider. As used herein, an authentication service 840 is a service used by one or more merchants to authenticate transactions associated with credit cards. An authentication service may be a third-party service that provides secure and verified authorization of the transactions.

In an embodiment, elements of the authentication service 840 are running as an application or web service operating on a computing device such as the computing device 802 described herein. In such an embodiment, the application or web service of the authentication service 840 may be provided by a financial services system (e.g., a bank, a transaction processing system, an inventory management system, or some other such financial services system). In an embodiment, elements of the authentication service 840 are running on an auxiliary device or system configured to execute tasks associated with the authentication service 840 (e.g., provides authentication using credit card processing device attached to a smart phone or tablet). In an embodiment, elements of the authentication service 840 are running on virtual device such as those described herein. Although not illustrated here, in an embodiment, the authentication service 840 may be running on one or more of a plurality of devices that may be interconnected using a network such as the network 822.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 802) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the example process 600 for determining spending allowances along different spend categories for new lines of credit illustrated in FIG. 6). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 802.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112 (f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

What is claimed is:

1. A computer-implemented method, comprising:

accessing, by a computing device and from a database maintained by a payment instrument service, historical user spend data corresponding to one or more financial institution accounts and expenditures associated with a user, wherein the historical user spend data is organized according to a plurality of spend categories and is accessed in response to an application for a secured payment instrument;

processing, by the computing device, the historical user spend data and user credit data through an allowance generation machine learning system executing an allowance generation algorithm to identify an allowance grouping cluster, wherein the allowance grouping cluster is associated with a set of financial accounts corresponding to similarly situated users and to allowances allocated according to the plurality of spend categories, wherein the allowance generation algorithm is dynamically trained in real-time by processing an allowance dataset according to a set of allowance vectors corresponding to allowances allocated to a set of other secured payment instruments associated with other users and adjustments made to the allowances based on updated spend data associated with the other secured payment instruments;

identifying, by the computing device and based on the allowance grouping cluster, a line of credit and an initial allocation of a set of allowances for the secured payment instrument, wherein the initial allocation associated with the allowance grouping cluster is defined according to the plurality of spend categories;

issuing the secured payment instrument that is secured by the initial allocation and the one or more financial institution accounts;

dynamically updating, by the computing device, the allowance generation algorithm based on ongoing performance and updated spend data of different users associated with different secured payment instruments, and according to individual sets of allowances and graduation determinations associated with the different secured payment instruments;

processing, in real-time and by the computing device, new transaction data corresponding to the secured payment instrument through the updated allowance generation algorithm to generate a new allocation of the set of allowances for the secured payment instrument;

dynamically processing, by the computing device and as the new allocation is generated, the new transaction data through a graduation machine learning system executing a graduation algorithm to identify a graduation grouping cluster corresponding to a graduation determination for the secured payment instrument, wherein the graduation algorithm is trained using a graduation dataset according to a set of graduation vectors corresponding to the graduation determinations, and wherein the graduation dataset includes allowance data corresponding to different sets of allowances and adjustments made to the different sets of allowances obtained from the allowance generation machine learning system; and providing, by the computing device and based on the graduation grouping cluster, an offer to graduate the secured payment instrument to an unsecured payment instrument.

2. The computer-implemented method of claim 1, further comprising:

obtaining new user credit data; and adjusting the initial allocation according to the new user credit data.

3. The computer-implemented method of claim 1, further comprising:

updating a user interface associated with the user to present the initial allocation of the set of allowances;

detecting a set of modifications to the initial allocation of the set of allowances through the user interface; and evaluating the set of modifications according to the historical user spend data, wherein when the set of modifications is accepted, the secured payment instrument is issued according to the set of modifications.

4. The computer-implemented method of claim 1, wherein the secured payment instrument is secured without a security deposit.

5. The computer-implemented method of claim 1, wherein the new allocation is generated in proportion to an increase in the line of credit associated with the secured payment instrument.

6. The computer-implemented method of claim 1, further comprising:

monitoring ongoing transactions associated with the secured payment instrument in real-time to obtain the new transaction data.

7. The computer-implemented method of claim 1, further comprising:

processing the graduation determinations associated with the different secured payment instruments and subsequent user performances according to the graduation determinations to update the graduation dataset; and retraining the graduation algorithm using the updated graduation dataset.

8. A system, comprising:

one or more processors; and memory storing thereon instructions that, as a result of being executed by the one or more processors, cause the system to:

access, from a database maintained by a payment instrument service, historical user spend data corresponding to one or more financial institution accounts and expenditures associated with a user, wherein the historical user spend data is organized according to a plurality of spend categories and is accessed in response to an application for a secured payment instrument;

process the historical user spend data and user credit data through an allowance generation machine learning system executing an allowance generation algorithm to identify an allowance grouping cluster, wherein the allowance grouping cluster is associated with a set of financial accounts corresponding to similarly situated users and to allowances allocated according to the plurality of spend categories, wherein the allowance generation algorithm is dynamically trained in real-time by processing an allowance dataset according to a set of allowance vectors corresponding to allowances allocated to a set of other secured payment instruments associated with other users and adjustments made to the allowances based on updated spend data associated with the other secured payment instruments;

identify, based on the allowance grouping cluster, a line of credit and an initial allocation of a set of allowances for the secured payment instrument, wherein the initial allocation associated with the allowance grouping cluster is defined according to the plurality of spend categories;

issue the secured payment instrument that is secured by the initial allocation and the one or more financial institution accounts;

dynamically update the allowance generation algorithm based on ongoing performance and updated spend data of different users associated with different secured payment instruments, and according to individual sets of allowances and graduation determinations associated with the different secured payment instruments;

process, in real-time, new transaction data corresponding to the secured payment instrument through the updated allowance generation algorithm to generate a new allocation of the set of allowances for the secured payment instrument;

dynamically process, as the new allocation is generated, the new transaction data through a graduation machine learning system executing a graduation algorithm to identify a graduation grouping cluster corresponding to a graduation determination for the secured payment instrument, wherein the graduation algorithm is trained using a graduation dataset according to a set of graduation vectors corresponding to the graduation determinations, and wherein the graduation dataset includes allowance data corresponding to different allowances obtained from the allowance generation machine learning system; and provide, based on the graduation grouping cluster, an offer to graduate the secured payment instrument to an unsecured payment instrument.

9. The system of claim 8, wherein the instructions further cause the system to:

obtain new user credit data; and adjust the initial allocation according to the new user credit data.

10. The system of claim 8, wherein the instructions further cause the system to:

update a user interface associated with the user to present the initial allocation of the set of allowances;

detect a set of modifications to the initial allocation of the set of allowances through the user interface; and evaluate the set of modifications according to the historical user spend data, wherein when the set of modifications is accepted, the secured payment instrument is issued according to the set of modifications.

11. The system of claim 8, wherein the secured payment instrument is secured without a security deposit.

12. The system of claim 8, wherein the new allocation is generated in proportion to an increase in the line of credit associated with the secured payment instrument.

13. The system of claim 8, wherein the instructions further cause the system to:

monitor ongoing transactions associated with the secured payment instrument in real-time to obtain the new transaction data.

14. The system of claim 8, wherein the instructions further cause the system to:

process the graduation determinations associated with the different secured payment instruments and subsequent user performances according to the graduation determinations to update the graduation dataset; and retrain the graduation algorithm using the updated graduation dataset.

15. A non-transitory, computer-readable storage medium storing thereon executable instructions that, as a result of being executed by one or more processors of a computer system, cause the computer system to:

access, from a database maintained by a payment instrument service, historical user spend data corresponding to one or more financial institution accounts and expenditures associated with a user, wherein the historical user spend data is organized according to a plurality of spend categories and is accessed in response to an application for a secured payment instrument;

process the historical user spend data and user credit data through an allowance generation machine learning system executing an allowance generation algorithm to identify an allowance grouping cluster, wherein the allowance grouping cluster is associated with a set of financial accounts corresponding to similarly situated users and to allowances allocated according to the plurality of spend categories, wherein the allowance generation algorithm is dynamically trained in real-time by processing an allowance dataset according to a set of allowance vectors corresponding to allowances allocated to a set of other secured payment instruments associated with other users and adjustments made to the allowances based on updated spend data associated with the other secured payment instruments;

identify, based on the allowance grouping cluster, a line of credit and an initial allocation of a set of allowances for the secured payment instrument, wherein the initial allocation associated with the allowance grouping cluster is defined according to the plurality of spend categories;

issue the secured payment instrument that is secured by the initial allocation and the one or more financial institution accounts;

dynamically update the allowance generation algorithm based on ongoing performance and updated spend data of different users associated with different secured payment instruments, and according to individual sets of allowances and graduation determinations associated with the different secured payment instruments;

process, in real-time, new transaction data corresponding to the secured payment instrument through the updated allowance generation algorithm to generate a new allocation of the set of allowances for the secured payment instrument;

dynamically process, as the new allocation is generated, the new transaction data through a graduation machine learning system executing a graduation algorithm to identify a graduation grouping cluster corresponding to a graduation determination for the secured payment instrument, wherein the graduation algorithm is trained using a graduation dataset according to a set of graduation vectors corresponding to the graduation determinations, and wherein the graduation dataset includes allowance data corresponding to different sets of allowances and adjustments made to the different sets of allowances obtained from the allowance generation machine learning system; and provide, based on the graduation grouping cluster, an offer to graduate the secured payment instrument to an unsecured payment instrument.

16. The non-transitory, computer-readable storage medium of claim 15, wherein the executable instructions further cause the computer system to:

obtain new user credit data; and adjust the initial allocation according to the new user credit data.

17. The non-transitory, computer-readable storage medium of claim 15, wherein the executable instructions further cause the computer system to:

update a user interface associated with the user to present the initial allocation of the set of allowances;

detect a set of modifications to the initial allocation of the set of allowances through the user interface; and evaluate the set of modifications according to the historical user spend data, wherein when the set of modifications is accepted, the secured payment instrument is issued according to the set of modifications.

18. The non-transitory, computer-readable storage medium of claim 15, wherein the secured payment instrument is secured without a security deposit.

19. The non-transitory, computer-readable storage medium of claim 15, wherein the new allocation is generated in proportion to an increase in the line of credit associated with the secured payment instrument.

20. The non-transitory, computer-readable storage medium of claim 15, wherein the executable instructions further cause the computer system to:

monitor ongoing transactions associated with the secured payment instrument in real-time to obtain the new transaction data.

21. The non-transitory, computer-readable storage medium of claim 15, wherein the executable instructions further cause the computer system to:

process the graduation determinations associated with the different secured payment instruments and subsequent user performances according to the graduation determinations to update the graduation dataset; and retrain the graduation algorithm using the updated graduation dataset.

* * * * *